United States Patent
Christiansen et al.

(10) Patent No.: US 9,251,036 B2
(45) Date of Patent: Feb. 2, 2016

(54) HIGH SPEED INTERCHIP HSIC USB MONITORING

(75) Inventors: Morten Christiansen, Arendal (NO); Jonny Blom, Tvedestrand (NO)

(73) Assignee: ST-ERICSSON SA, Plan-les-Ouates (CH)

(*) Notice: Subject to any disclaimer, the term of this patent is extended or adjusted under 35 U.S.C. 154(b) by 676 days.

(21) Appl. No.: 13/285,658

(22) Filed: Oct. 31, 2011

(65) Prior Publication Data

US 2012/0110217 A1    May 3, 2012

Related U.S. Application Data

(60) Provisional application No. 61/407,957, filed on Oct. 29, 2010.

(51) Int. Cl.
| | |
|---|---|
| G06F 3/00 | (2006.01) |
| G06F 11/34 | (2006.01) |
| H04L 12/26 | (2006.01) |
| G06F 13/38 | (2006.01) |

(52) U.S. Cl.
CPC ............ *G06F 11/348* (2013.01); *G06F 11/349* (2013.01); *G06F 13/385* (2013.01); *H04L 43/0817* (2013.01)

(58) Field of Classification Search
None
See application file for complete search history.

(56) References Cited

U.S. PATENT DOCUMENTS

| 5,051,944 A | 9/1991 | Fetterrolf et al. |
| 2009/0063717 A1* | 3/2009 | Bohm et al. ............. 710/8 |
| 2009/0198859 A1* | 8/2009 | Orishko et al. .......... 710/313 |

FOREIGN PATENT DOCUMENTS

GB    1 458 200    12/1976

OTHER PUBLICATIONS

Jean Christophe Lawson et al.: "High-Speed Inter-Chip USB Electrical Specification", version 1.0, Universal Serial Bus Specification Supplement Copyright, 2007, Sep. 23, 2007, entire document.
European Search Report in corresponding European Patent Application No. 11 776 450.6-1954 dated Mar. 20, 2014.

* cited by examiner

*Primary Examiner* — Henry Tsai
*Assistant Examiner* — Aurangzeb Hassan
(74) *Attorney, Agent, or Firm* — Patent Portfolio Builders PLLC

(57) ABSTRACT

Disclosed herein is a system for monitoring high speed interchip (HSIC) universal serial bus (USB) signals in a device comprising a USB controller configured to output first USB transceiver macro-cell (UTMI+) signals, an HSIC PHY transceiver configured to receive first UTMI+ signals from the USB controller and to convert and transmit received first UTMI+ signals as first HSIC signals, and to receive second HSIC signals and transmit them as second UTMI+ signals to the USB controller, a UTMI+ conversion block configured to receive first and second UTMI+ signals and to transform the received first and second UTMI+ signals to corresponding first and second ULPI signals, and transmit first and second ULPI signals, the first and second ULPI signals being equivalent to the first and second HSIC signals, and a ULPI PHY transceiver configured to receive the first and second ULPI signals and transmit corresponding first and second USB signals.

36 Claims, 14 Drawing Sheets

HIGH SPEED INTERCHIP HSIC USB MONITORING

RELATED APPLICATION

This application is related to, and claims priority from, U.S. Provisional Patent Application Ser. No. 61/407,957, entitled "HIGH SPEED INTERCHIP HSIC USB MONITORING", to Morten Christiansen, et al., filed on Oct. 29, 2010, the disclosure of which is incorporated here by reference.

TECHNICAL FIELD

The present invention relates generally to digital circuits, and more specifically to systems and methods for monitoring high speed serial interfaces, especially universal serial bus interfaces.

BACKGROUND

The Universal Serial Bus (USB) specification was originally released in 1996, updated in 1998, and enhanced for high speed data operations in 2000. USB originally allowed simple devices like keyboards, mice, and web-cameras, to be connected to complex hosts like personal computers (PCs) using cables up to 15' in length, at up to 480 Mbps signaling speed. In addition, connected devices could be powered from the host.

USB is the most successful interconnect specification ever developed for consumer electronics (CE) as measured by the number of devices using USB. About 10 billion USB devices now exist, and USB is used for most CE products like personal computers, audio and video devices, MP3 players, mass storage, television sets, and satellite and cable decoders. USB is also used for professional electronics, test and measurement devices, personal health equipment, among many other types of electronic devices. Essentially any type of electronic device that requires the transfer and/or storage of data uses a USB interface. Various standalone apparatus easily connect using USB.

The success of USB has led to new and simpler types of hosts, as well as more complex multifunction devices. One such example includes a TV set as a host that can be used to show the movie recorded by a mobile phone. Or, a mobile phone that can be used as a host that can output the same video to a monitor. Mobile phones now account for 30-50% of the 2-3 billion USB devices that are currently shipped each year.

USB is also increasingly being used inside systems and devices. A typical example is to (permanently) connect, for instance, an integrated fingerprint reader and video camera in a laptop PC. This approach, however, is not without its problems.

First, standard USB signaling is not trivial to fully integrate in the complex system-on-chip (SoC; or an integrated chip) solutions made using today's advanced silicon processes. Therefore, the USB transceiver macro-cell interface (UTMI+) Low PinCount Interface (ULPI) specification was published in 2004 to allow the analog transceiver ("PHY" or physical interface/layer responsible for handling USB signaling) to be moved to a separate chip made in a different and more suitable silicon process than what is used to manufacture the digital SoC.

Second, standard USB signaling is not power efficient. This was not a major concern for use in desktop PCs or similar types of products. However, power efficiency is important in general in many other types of devices, and especially vital for portable devices. Minimizing power consumption means increasing battery life, longevity, and provides a better user experience.

As a result, the High Speed InterChip (HSIC) specification was released in 2007 to address the concerns of analog-versus-digital technologies, and power consumption. The HSIC specification describes how standard USB signaling can be replaced by HSIC signaling using a digital PHY. That is, instead of a separate analog transceiver, an integrated component, a digital transceiver, which is much more similar to the rest of the circuitry it is connected to, is used for USB interfaces within devices. This allows a power optimized connection of up to 4" in length to be used between chips and modules inside a system with the digital HSIC transceiver integrated in the digital SoC. Apart from the electrical differences, HSIC and standard USB uses the same lower level and higher level USB protocols.

Because of the adoption and use of the HSIC specification, HSIC is increasingly being used in portable devices such as mobile phones. For example, one manner of using HSIC is to connect a wireless modem to the application processor in an advanced mobile phone. As discussed above, power optimization and integration are key factors in marketing successful products (i.e., small size, long battery life and enhanced user experience are key requirements). The HSIC modem and the application processor or host USB functionality is quite complex. An effective development, test and verification environments for HSIC is therefore mandatory for these products.

Unfortunately, HSIC signaling is not robust. Preparing the printed circuit board (PCB) for connection to test and verification equipment will affect HSIC signal integrity, sometimes to the extent that HSIC communications are no longer possible. The market for specialized HSIC test equipment is very small and in practice non-existent. Furthermore, as explained in greater detail below, standard USB analyzers cannot be used. This means effective development, test and verification of USB communications for products using HSIC has been, to this point in time, been virtually impossible.

It is useful to understand how high speed USB components are inter-connected and how standard USB communications are monitored to understand the problems with testing HSIC signals and the general inventive concept.

By way of example, a USB controller in a wireless modem has a Universal Transceiver Macrocell Interface (UTMI+) for connection to a USB transceiver. In the year 2000, most, if not all USB transceivers in commercial products were macrocells and integrated on the same SoC as the USB controller.

A UTMI+ interface uses between 50 and 60 pins depending on which level of Plus-functionality is needed. As a result, UTMI+ is not very useful for external transceivers, as pin-count must be minimized for size, cost, and power reasons in the digital SoC. To connect to an external ULPI transceiver, a ULPI wrapper on the UTMI+ interface is added. The ULPI wrapper provides a means for reducing the pin count on the UTMI+ interface, yet still provides the same functionality.

In the figures described below, only the data paths are shown, and not the control paths. According to exemplary embodiments, the arrows in the figures indicate the general direction of data transfers.

FIG. 1 illustrates a block diagram of a standard USB device (USB device) 7 (comprising USB controller 2, ULPI wrapper 4 and ULPI PHY 6, among other components, not shown) connected to a standard USB host 8, with a USB analyzer 10 for debug attached to the interface between the USB host 8 and ULPI PHY 6.

It is useful to understand the basic concepts of a USB transaction: A USB transaction consists of token, data, and handshake packets. When USB host 8 has data to send to USB device 7, it will first send a token indicating that data is going to follow. USB host 8 then sends the data. USB device 7 answers with a handshake to indicate that data was received. When USB host 8 wants to receive data from USB device 7, it sends a token indicating that data is expected. If USB device 7 has data to send, it sends it and USB host 8 answers with a handshake to indicate that data was received. If USB device 7 does not have data to send to USB host 8, USB device 7 returns a "no data" handshake and USB host 8 will request data sometime later. Thus, communications between USB host 8 and USB device 7 involves a series of token transmissions, exchanges of data, and handshakes to complete and verify the successful transfer of data.

Standard USB device 7 comprises USB controller 2, the output of which is a UTMI+ signal and is connected to ULPI wrapper 4, the output of which are ULPI signals. The purpose of ULPI wrapper 4 is to reduce the amount of signals being used to transmit and receive data from USB controller 2 and USB host 8. ULPI PHY (transceiver) 6 is also part of standard USB device 7 (as discussed above, it is physically separated from the other components of standard USB device 7, as it is comprised of analog circuitry, which is very difficult to integrate with digital circuitry on a single integrated circuit; this is why ULPI PHY is shown enclosed by the dashed lines within standard USB device 7), and receives the ULPI signals output by ULPI wrapper 4, and transmits them to USB host 8 through USB analyzer 10, and conversely receives USB signals from USB host 8 and directs them to the ULPI wrapper to be converted to UTMI+ form to be received and processed by USB controller 2.

USB analyzer 10 is a passive "sniffer" type device. Some implementations use a high impedance pass-through mode allowing connection of USB analyzer 10 with more than one standard USB cable 14. This kind of connection approach has been used since the first USB analyzers were developed together with the USB specifications. USB signals from standard USB device 7 are transmitted by ULPI PHY 6 through one cable, 14a, to USB analyzer 10. At USB analyzer 10, high impedance tap-off 42 can be seen connected to the short trace that connects a first connector and a second connector at USB analyzer 10. The very short high impedance tap off 42 has virtually no effect on the substantially longer low impedance USB signal run that includes USB cable 14a and a second cable, 14b. Here, the second connector at USB analyzer 10 is connected to USB host 8 via second USB cable 14b.

All USB traffic, regardless of direction from USB host 8 to USB device 7, or from USB device 7 to USB host 8, can be captured by USB analyzer 10 and transferred to USB analyzer host 12 for e.g. pre-processing and display. Powerful software tools, coupled with sophisticated hardware designs, have been developed by the industry and included in USB analyzers to provide for highly functional monitoring and error detection. USB analyzer 10 can be set up to filter and trigger on certain conditions, including various types of errors and certain transactions, and only capture traffic that is relevant for the problem to be investigated. USB analyzer 10 might also output a trigger signal when a certain condition is met. Cross-triggering with existing software development tools on USB host 8 and/or USB device 7 allows the capture of a sequence of processor instructions that leads to a USB error. The sequence that leads to the error can then be investigated.

FIG. 2 illustrates a block diagram of first modified USB device 9 with selectable ULPI or HSIC capability, connectable to either standard USB host 8 or standard HSIC host 18. First modified USB device 9 comprises USB controller 2, ULPI/HSIC switch/mux 20, ULPI wrapper 4, ULPI PHY 6, and HSIC PHY 16. USB controller 2, the output of which is a UTMI+ signal, is connected to ULPI/HSIC switch/mux (switch/mux) 20. The UTMI+ signals output from USB controller 2 can therefore be input to HSIC PHY (a transceiver) 16 or to ULPI wrapper 4. The output of ULPI wrapper 4 is input to ULPI PHY 6, as with standard USB device 7. HSIC PHY 16 transmits and receives signals to/from HSIC host 18 via HSIC cable 34, and ULPI PHY transmits and receives signals to/from USB host 8 via USB cable 14.

Some SoCs have the capability to use either standard USB or HSIC signaling, as shown in FIG. 2. When an internal HSIC transceiver (HSIC PHY 16) is integrated on the same SoC, as shown in FIG. 2, switch/mux 20 is used to connect either HSIC PHY 16 to USB controller 2, or ULPI wrapper 4 to USB controller 2. Simultaneous operation of both HSIC and standard USB is not possible. The output of switch/mux 20 is normally selected based on the product the SoC is used in. Furthermore, selecting USB or HSIC on a session-by-session basis depending on the use and/or application is also possible.

When developing the HSIC specification, it was believed that advanced HSIC debug and test would not be needed, as existing USB software, protocols, and applications would be reused. However this is not always feasible due to the different requirements and capabilities between an embedded host, as exemplified by a mobile phone application processor, and a non-embedded USB host, as exemplified by a personal computer.

FIG. 3 illustrates a block diagram of second modified USB device 11 (with some components omitted for the dual purposes of clarity and brevity). The USB device 11 is connected to a standard HSIC host 18 via a proposed HSIC analyzer 22. The HSIC analyzer 22 is furthermore connected to HSIC analyzer host 24 for debug. It would appear to one of ordinary skill in the art that, in accordance with the configuration shown in FIG. 1, a similar test set-up would work in a fashion similar to that shown in FIG. 1. However it has been found that the configuration shown in FIG. 2 does not work. It has been determined that even preparing for an HSIC tap-off to HSIC analyzer 22 will interfere with HSIC communications. Connecting HSIC analyzer 22 to the circuit shown in FIG. 3 often interferes to the extent that HSIC communication fails. There are several reasons why there is such difficulty in testing HSIC communications. The most significant reason is that when the specification was developed for HSIC, it was very inclusive and broad, to allow for significant flexibility in manufacturing SoCs to include HSIC capabilities. Unfortunately, this had the unintended consequence of making it very difficult, and therefore expensive, to adequately design test equipment. In effect, because there is so much discretion in designing the HSIC communications interface, a test equipment manufacturer would have to almost know the exact specifications of the equipment under test. That would make it prohibitively expensive to design and manufacture the test equipment, as the test equipment manufacturer would not know how many other possible customers are using the same or similar specifications. Consequently, there is virtually no affordable HSIC test equipment capable of testing all HSIC communication interfaces. FIG. 4 illustrates a block diagram of third modified USB device 11 connected to standard HSIC host 18, in a setup similar to that shown in FIG. 3, with HSIC analyzer 22 for debug attached to between HSIC host 18 and HSIC PHY 16. In the configuration shown in FIG. 4, however, HSIC host 18 is connected to HSIC PHY 16 via a very short printed circuit board trace (with a length "$I_1$"), and external HSIC analyzer 22 is connected to HSIC host 18 and HSIC PHY 16 via a very long USB interconnect 14b (with a length $I_2$, typically such that $I_2 \gg I_1$). The influence of the "tap-off" 14b is significant in that it is very long, and a high-impedance connection. The energy that is transmitted from either HSIC PHY 16 or HSIC host 18 is reduced due to reflections that will occur at HSIC analyzer 22 resulting from the substantial differences in impedance between the much longer tap off 14b and the shorter (lower impedance) printed circuit board interconnect 14a. These reflections will introduce distortions in the HSIC signals transmitted between HSIC PHY 16 and HSIC host 18.

Not being able to test and debug HSIC communication has been found to be a major problem for HSIC product development and means that further development and verification of HSIC products are virtually impossible. Accordingly, it would be desirable to provide a method and apparatus to facilitate monitoring and protocol analysis of HSIC USB signaling without connecting to and thus compromising HSIC signal integrity.

SUMMARY OF THE INVENTION

It is therefore a general aspect of the invention to provide a system and method for testing of high speed inter-chip USB communications that will obviate or minimize problems of the type previously described. According to a first aspect of the present invention, a system for monitoring high speed interchip (HSIC) universal serial bus (USB) signals in a device is provided, comprising a USB controller (2) configured to output first USB transceiver macro-cell (UTMI+) signals, an HSIC PHY transceiver (16) configured to receive the first UTMI+ signals from the USB controller and to convert and transmit the received first UTMI+ signals as first HSIC signals, and is further configured to receive second HSIC signals and transmit them as second UTMI+ signals to the USB controller, a UTMI+ conversion block configured to receive the first and second UTMI+ signals and to transform the received first and second UTMI+ signals to corresponding first and second ULPI signals, and transmit the first and second ULPI signals, the first and second ULPI signals being equivalent to the first and second HSIC signals, and a ULPI PHY transceiver (6) configured to receive the first and second ULPI signals and transmit corresponding first and second USB signals. The term "equivalent" is used even though in the nature of for instance the conversion or transforming process, noise from within the system or from external interference can affect what the output instantaneous USB signals look like, even if the instantaneous UTMI+ input signals do not vary. It is well known to the person skilled in the art that such errors and deviations occur. It is also important to note that signal levels may be modified within the system to satisfy signal level requirements in different parts of the system. For instance, HSIC signaling may use a signal level of 1.2 V. UTMI+ internally may use 1.2 V and thus can match the HSIC PHY. However, UTMI+ has used 1.8 V and has thus required down-conversion to 1.2 V. It is obvious to the person skilled in the art that such modifications also fall within the term "equivalent".

According to the first aspect of the present invention, the UTMI+ conversion block comprises a UTMI+ transformer (28) configured to receive the first and second UTMI+ signals and modify the received first and second UTMI+ signals into first and second modified UTMI+ signals, and output the modified first and second UTMI+ signals, and a UTMI+ low pin count interface (ULPI) wrapper (4) configured to receive the first and second modified UTMI+ signals from the UTMI+ transformer and convert the received modified first and second UTMI+ signals into the first and second ULPI signals.

Still further according to the first aspect of the present invention, the UTMI+ transformer is configured to transform at least timing of the received first and second UTMI+ signals, wherein such timing transformation includes inter-packet gap modifications of the received first and second UTMI+ signals. According to the first aspect, the UTMI+ conversion block is further configured to generate a standard high speed USB handshake signal such that a USB analyzer (10), when operably connected to receive the first and second USB signals, can capture the first and second USB signals.

The first aspect still further comprises a switch configured to close a path between the USB controller and the UTMI+ conversion block, and between the HSIC PHY transceiver and the UTMI+ conversion block, such that the first and second UTMI+ signals can be received by the UTMI+ conversion block, and the switch is further configured to open the path such that the first and second UTMI+ signals cannot be received by the UTMI+ conversion block.

According to a second aspect of the present invention, a system for monitoring both universal serial bus (USB) and high speed interchip (HSIC) universal serial bus (USB) signals in a device is provided, comprising a first multiplexer configured to operate in at least two configurations, a USB controller (2) configured to output first USB transceiver macro-cell (UTMI+) signals, an HSIC PHY transceiver (16) configured to, when the first multiplexer operates in a first configuration, receive the first UTMI+ signals from the USB controller and to convert and transmit the received first UTMI+ signals as first HSIC signals, and is further configured to receive second HSIC signals and transmit them as second UTMI+ signals to the USB controller, and a UTMI+ conversion block configured to receive the first and second UTMI+ signals and to transform the received first and second UTMI+ signals to corresponding first and second ULPI signals, and transmit the first and second ULPI signals, the first and second ULPI signals being equivalent to the first and second HSIC signals.

According to the second aspect, the first multiplexer is configured to operate in the first configuration when the first multiplexer receives the first and second UTMI+ signals, and the received first UTMI+ signals transmitted by the USB controller are output to the HSIC PHY transceiver to be transmitted as the first HSIC signals, and further the received second UTMI+ signals are output to the USB controller.

Still further according to the second aspect, the UTMI+ conversion block comprises a UTMI+ transformer (28) configured to receive the first and second UTMI+ signals and modify the received first and second UTMI+ signals into first and second modified UTMI+ signals, and output the modified first and second UTMI+ signals, a UTMI+ low pin count interface (ULPI) wrapper (4) configured to receive the first and second modified UTMI+ signals from the UTMI+ transformer and convert the received modified first and second UTMI+ signals into the first and second ULPI signals, the first and second ULPI signals being equivalent to the first and second HSIC signals, and wherein the first multiplexer is further configured to receive the first and second UTMI+ signals and to operate in a second configuration that includes operation of the first configuration and wherein the received first and second modified UTMI+ signals are output to the ULPI wrapper, and wherein the system further comprises a ULPI PHY transceiver (6) configured to receive the first and second ULPI signals and transmit corresponding first and second USB signals.

Still further according to the second aspect, the UTMI+ transformer is configured to transform at least timing of the received first and second UTMI+ signals, wherein such timing transformation includes inter-packet gap modifications of the received first and second UTMI+ signals, and wherein the UTMI+ transformer is further configured to generate a standard high speed USB handshake signal such that a USB analyzer (10), when operably connected to receive the first and second USB signals, can capture the first and second USB signals.

Still further according to the second aspect, the system further comprises a UTMI+ low pin count interface (ULPI) wrapper (4) configured to receive the first UTMI+ signals and to transmit corresponding first ULPI signals, and further wherein the ULPI wrapper (4) is further configured to receive second ULPI signals and to transmit corresponding third UTMI+ signals to the USB controller when the first multiplexer alternatively operates in the third configuration such that the HSIC PHY transceiver cannot transmit second UTMI+ signals to the USB controller, and a ULPI PHY transceiver (6) configured to receive first ULPI signals and transmit corresponding first USB signals, and to receive second USB signals and transmit corresponding second ULPI signals to the ULPI wrapper.

The system according to the second aspect further comprises a USB analyzer (10) configured to monitor the transmitted corresponding first and second USB signals, whereby an analysis of the first and second HSIC signals can be performed via the first and second USB signals, and a USB analyzer host configured to perform at least one of control of the USB analyzer, receive original data corresponding to the first and second USB signals from the USB analyzer, process the original data received from the USB analyzer, and store original and processed data.

According to a third aspect of the present invention, a system for monitoring high speed interconnect (HSIC) universal serial bus (USB) signals in a device is provided comprising a first USB controller (3) configured to output first USB transceiver macro-cell (UTMI+) signals, an HSIC PHY transceiver (16) configured to receive the first UTMI+ signals from the first USB controller (3) and to convert and transmit the received first UTMI+ signals as first HSIC signals, and is further configured to receive second HSIC signals and transmit them as second UTMI+ signals to the first USB controller, a UTMI+ transformer (28) configured to receive the first and second UTMI+ signals and modify the received first and second UTMI+ signals into first and second modified UTMI+ signals, and output the modified first and second UTMI+ signals, a switch configured to operate in at least two modes, wherein in a first mode the switch is configured to receive both the modified first and second UTMI+ signals and output either of the received signals, and a UTMI+ low pin count interface (ULPI) wrapper (4) configured to receive the first and second modified UTMI+ signals from the switch and convert the received modified first and second UTMI+ signals into the first and second ULPI signals.

According to the third aspect, the UTMI+ transformer is configured to transform at least timing of the received first and second UTMI+ signals, wherein such timing transformation includes inter-packet gap modifications of the received first and second UTMI+ signals, and further comprises a ULPI PHY transceiver (6) configured to receive the first and second ULPI signals and transmit corresponding first and second USB signals.

According to the third aspect, the UTMI+ transformer is further configured to generate a standard high speed USB handshake signal such that the USB analyzer (10) can capture high speed USB signals transmitted by the ULPI PHY transceiver.

According to the third aspect, the system further comprises a ULPI PHY transceiver configured to receive ULPI signals and transmit corresponding USB signals, and is further configured to receive USB signals and transmit corresponding ULPI signals, and a second USB controller configured to output third UTMI+ low pin count interface (ULPI) signals, and wherein, the first switch (32) is further configured to operate in a second mode such that signals received by the HSIC PHY transceiver are not transmitted to the first USB controller, and further wherein, while the first switch is operating in the second mode, the third ULPI signals transmitted by the second USB controller are received by the first switch and output to the ULPI wrapper that receives the third ULPI signals and transfers the third ULPI signals to the ULPI PHY transceiver to output corresponding third USB signals, and further wherein the ULPI PHY transceiver receives fourth USB signals and outputs fourth ULPI signals to the ULPI wrapper, wherein the ULPI wrapper outputs the fourth ULPI signals to the second USB controller through the first switch.

According to a fourth aspect of the present invention, a method for monitoring high speed interconnect (HSIC) universal serial bus (USB) signals in a device is provided, comprising receiving UTMI+ signals at a UTMI+ conversion block, wherein the UTMI+ signals represent HSIC signals, transforming the received UTMI+ signals into UTMI+ low pin count interface (ULPI) signals, and transmitting the ULPI signals as standard USB signals, wherein the transmitted USB signals are equivalent to the HSIC signals received by the UTMI+ conversion block.

According to the fourth aspect, the step of transforming comprises transforming at least timing of the received first and second UTMI+ signals, wherein such timing transformation includes inter-packet gap modifications of the received first and second UTMI+ signals, and the step of receiving UTMI+ signals comprises receiving UTMI+ signals transmitted from at least one of a USB controller (2) and an HSIC PHY transceiver (16).

According to the fourth aspect, the UTMI+ signals transmitted by the USB controller are received by the HSIC PHY transceiver and output as HSIC signals, and further wherein the UTMI+ signals transmitted by the HSIC PHY transceiver are received by the HSIC PHY transceiver as HSIC signals.

According to the fourth aspect, the step of receiving UTMI+ signals at a UTMI+ conversion block comprises receiving the UTMI+ signals through a switch when the switch is in a closed position, and further wherein the UTMI+ signals are not receivable by the UTMI conversion block when the switch is in an open position, and the UTMI+ conversion block comprises a UTMI+ transformer (28) configured to receive the first and second UTMI+ signals and modify the received first and second UTMI+ signals into first and second modified UTMI+ signals, and output the modified first and second UTMI+ signals and a UTMI+ low pin count interface (ULPI) wrapper (4) configured to receive the first and second modified UTMI+ signals from the UTMI+ transformer and convert the received modified first and second UTMI+ signals into the first and second ULPI signals.

According to a fifth aspect of the present invention, a method for monitoring high speed interchip (HSIC) universal serial bus (USB) signals in a device is provided, comprising receiving first UTMI+ signals transmitted by a USB controller (2) at a first switch operating in a first mode and outputting the received first UTMI+ signals from the USB controller to a HISC PHY transceiver to transmit as first HSIC signals, and receiving second HSIC signals at the HSIC PHY transceiver and outputting the second HSIC signals as second UTMI+ signals to the first switch that operates in a first mode to output the received second UTMI+ signals transmitted by the HSIC PHY transceiver to the USB controller.

According to a sixth aspect of the present invention, a method for monitoring high speed interchip (HSIC) universal serial bus (USB) signals in a device is provided, comprising receiving first and second UTMI+ signals at a UTMI+ conversion block, the first UTMI+ signals corresponding to first HSIC signals transmitted by the device, and second UTMI+ signals corresponding to second HSIC signals received by the device, transforming the first and second UTMI+ signals into first and second ULPI signals, the first and second ULPI signals being equivalent to the first and second HSIC signals, and transmitting out from the device first and second USB signals, corresponding to first and second HSIC signals, respectively.

Still further according to the sixth aspect, the UTMI+ conversion block includes a UTMI+ transformer configured to receive the first and second UTMI+ signals and transform the received first and second UTMI+ signals into first and second modified UTMI+ signals, and output the modified first and second UTMI+ signals, and wherein the UTMI+ conversion block further includes a UTMI+ low pin count interface (ULPI) wrapper (4) configured to receive the modified first and second ULPI signals from the UTMI+ transformer and convert the received modified first and second UTMI+ signals into the first and second ULPI signals, and further wherein the UTMI+ conversion block includes a switch operable in a mode that connects a USB controller that outputs the first UTMI+ signals to an HSIC PHY transceiver that receives the first UTMI+ signals and outputs the first HSIC signals, and wherein the HSIC PHY transceiver receives the second HSIC signals and outputs the second UTMI+ signals to the USB controller, and further wherein the switch connects both of the first and second UTMI+ signals to the ULPI wrapper.

According to the sixth aspect, the transforming in the UTMI+ transformer comprises transforming at least one of timing of the received first and second UTMI+ signals, wherein such timing transformation includes inter-packet gap modifications of the received first and second UTMI+ signals, and the method further comprises generating a standard high speed USB handshake signal such that a USB analyzer, when operable connected to receive the first and second USB signals, can capture the first and second USB signals.

According to a seventh aspect of the present invention, a method for monitoring high speed interchip (HSIC) universal serial bus (USB) signals in a device is provided, comprising transmitting first UTMI+ signals from a USB controller (2), receiving the first UTMI+ signals transmitted by the USB controller at a first switch operating in a first mode and outputting the received first UTMI+ signals, receiving the first UTMI+ signals from the first switch at a ULPI wrapper and outputting corresponding first ULPI signals, receiving the first ULPI signals at an HISC PHY transceiver and outputting corresponding first USB signals, receiving second USB signals at the HSIC PHY transceiver and outputting second UTMI+ signals that correspond to the second USB signals, receiving the second UTMI+ signals at the ULPI wrapper and outputting second ULPI signals that correspond to the second USB signals, and receiving the second ULPI signals at the first switch operating in the first mode to output the received second UTMI+ signals that correspond to the second USB signals to the USB controller.

According to an eighth aspect of the present invention, a method for monitoring high speed interchip (HSIC) universal serial bus (USB) signals in a device is provided, comprising receiving UTMI+ signals at a UTMI+ transformer (28), wherein the UTMI+ signals represent HSIC signals transmitted or received by the device, transforming the received UTMI+ signals into modified UTMI+ signals, receiving the modified UTMI+ signals at a first port of a switch operating in a first mode, outputting the modified UTMI+ signals from the switch at a second port, receiving the modified UTMI+ signals at a ULPI wrapper, and outputting corresponding ULPI signals, and receiving the corresponding ULPI signal at a ULPI PHY transceiver, and outputting from the ULPI PHY transceiver standard USB signals that correspond to the transmitted or received HSIC signals when the switch is operating in the first mode.

According to the eighth aspect, the switch operates in a second mode such that modified UTMI+ signals are not received by the switch, the method further comprising transmitting first ULPI signals by a ULPI USB controller, receiving the transmitted first ULPI signals at a third port of the switch, outputting from the second port of the switch the first ULPI signals, receiving the first ULPI signals at a ULPI wrapper, and outputting corresponding ULPI signals to the ULPI PHY transceiver, transmitting from the ULPI PHY transceiver first USB signals corresponding to the first ULPI signals, receiving second USB signals by the ULPI PHY transceiver, outputting second ULPI signals that correspond to the received second USB signals from the ULPI PHY transceiver, receiving the second ULPI signals from the ULPI PHY transceiver at the ULPI wrapper and outputting the received second ULPI signals through the switch operating in the second mode to the UILPI USB controller.

According to the eighth aspect, the step of transforming comprises transforming at least timing of the received UTMI+ signals, wherein such timing transformation includes inter-packet gap modifications of the received UTMI+ signals, and the step of receiving UTMI+ signals comprises receiving UTMI+ signals transmitted from at least one of a USB controller (2) and an HSIC PHY transceiver (16).

According to the eighth aspect, the method further comprises transmitting UTMI+ signals by a USB HSIC controller that are received by the HSIC PHY transceiver and output as HSIC signals, and receiving HSIC signals by the HSIC PHY transceiver and outputting the same as UTMI+ signals.

BRIEF DESCRIPTION OF THE DRAWINGS

The above and other objects and features of the present general inventive concept will be exemplified in the following description of embodiments with reference to the following figures, wherein like reference numerals refer to like parts throughout the various figures unless otherwise specified, and wherein.

DETAILED DESCRIPTION

Figure 1:
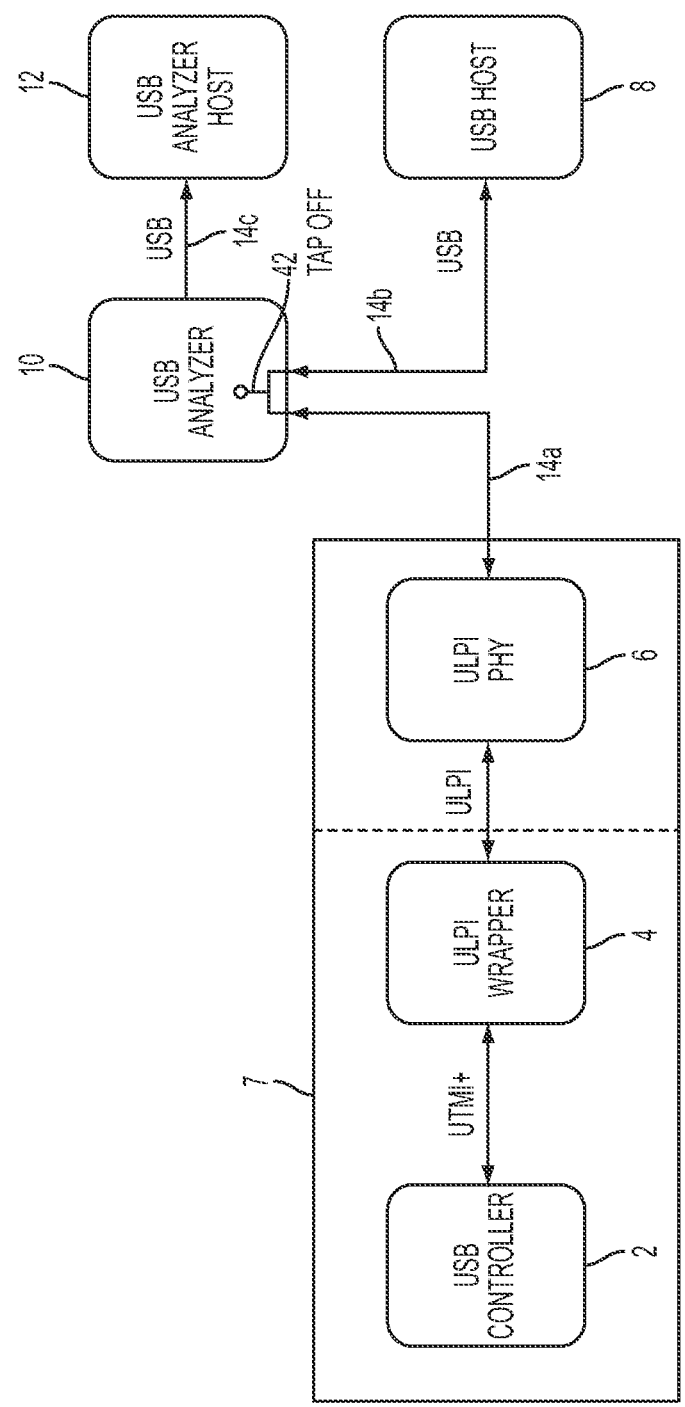
FIG. 1 illustrates a block diagram of a standard USB device connected to a standard USB host, with a USB analyzer for monitoring and analyzing USB signals attached to the interface between the USB host and ULPI PHY.
Figure 2:
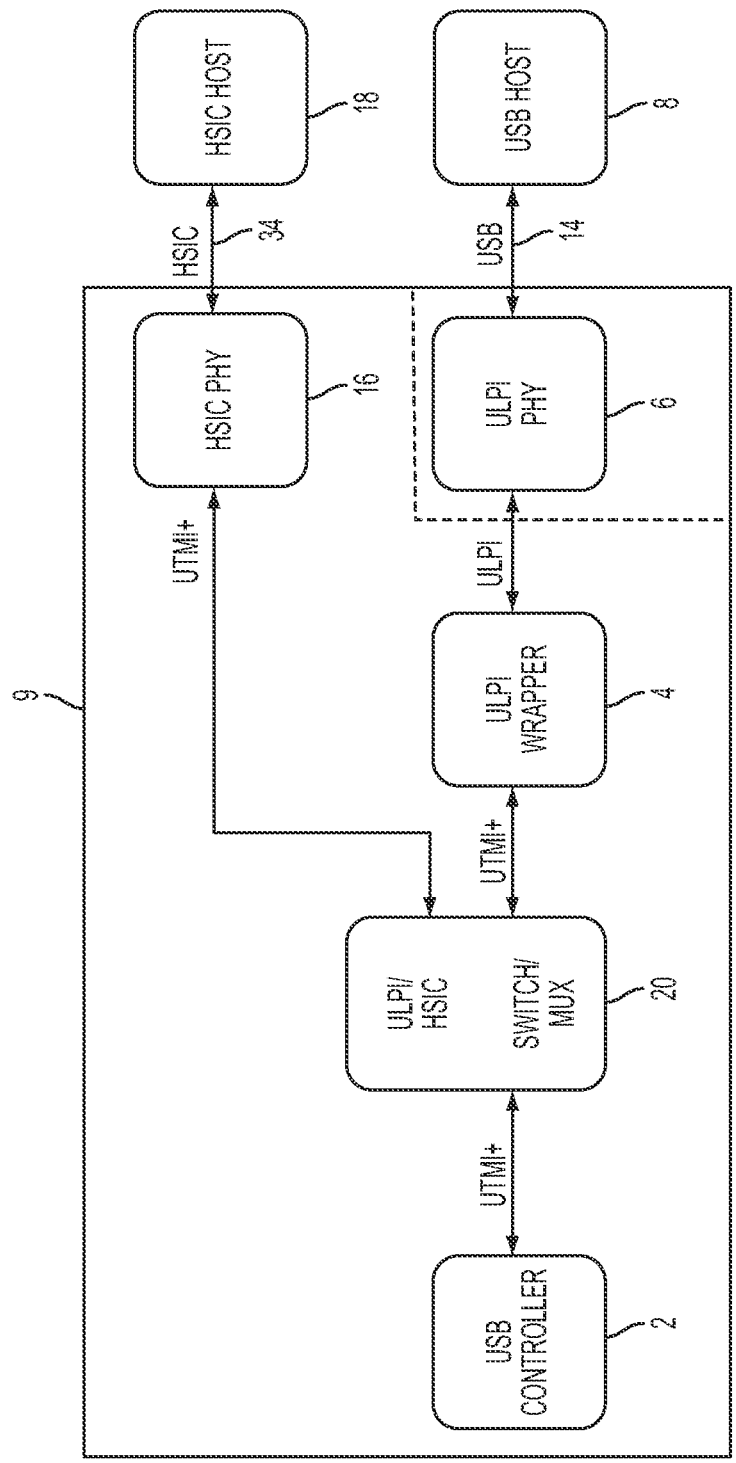
FIG. 2 illustrates a block diagram of a first modified USB device with selectable ULPI or HSIC capability, connectable to either a standard USB host or a standard HSIC host.

The inventive concept is described more fully hereinafter with reference to the accompanying drawings, in which embodiments of the inventive concept are shown. In the drawings, the size and relative sizes of layers and regions may be exaggerated for clarity. Like numbers refer to like elements throughout. This inventive concept may, however, be embodied in many different forms and should not be construed as limited to the embodiments set forth herein. The scope of the invention is therefore defined by the appended claims.

Used throughout the specification are several acronyms, the meaning of which are provided as follows: universal serial bus (USB); high speed interchip (HSIC); consumer electronics (CE); personal computer (PC); system-on-chip (SoC); USB transceiver macro-cell interface (UMTI+); UTMI+ low pin count interface (ULPI); physical layer/interface (PHY); and printed circuit board (PCB).

Exemplary embodiments discussed herein could, in some cases, be suitable for use with (or in some cases possibly integrated with) SoC circuits used in, by way of example only, mobile devices that include mobile phones, and allow standard USB analysis tools to be used.

Figure 5:
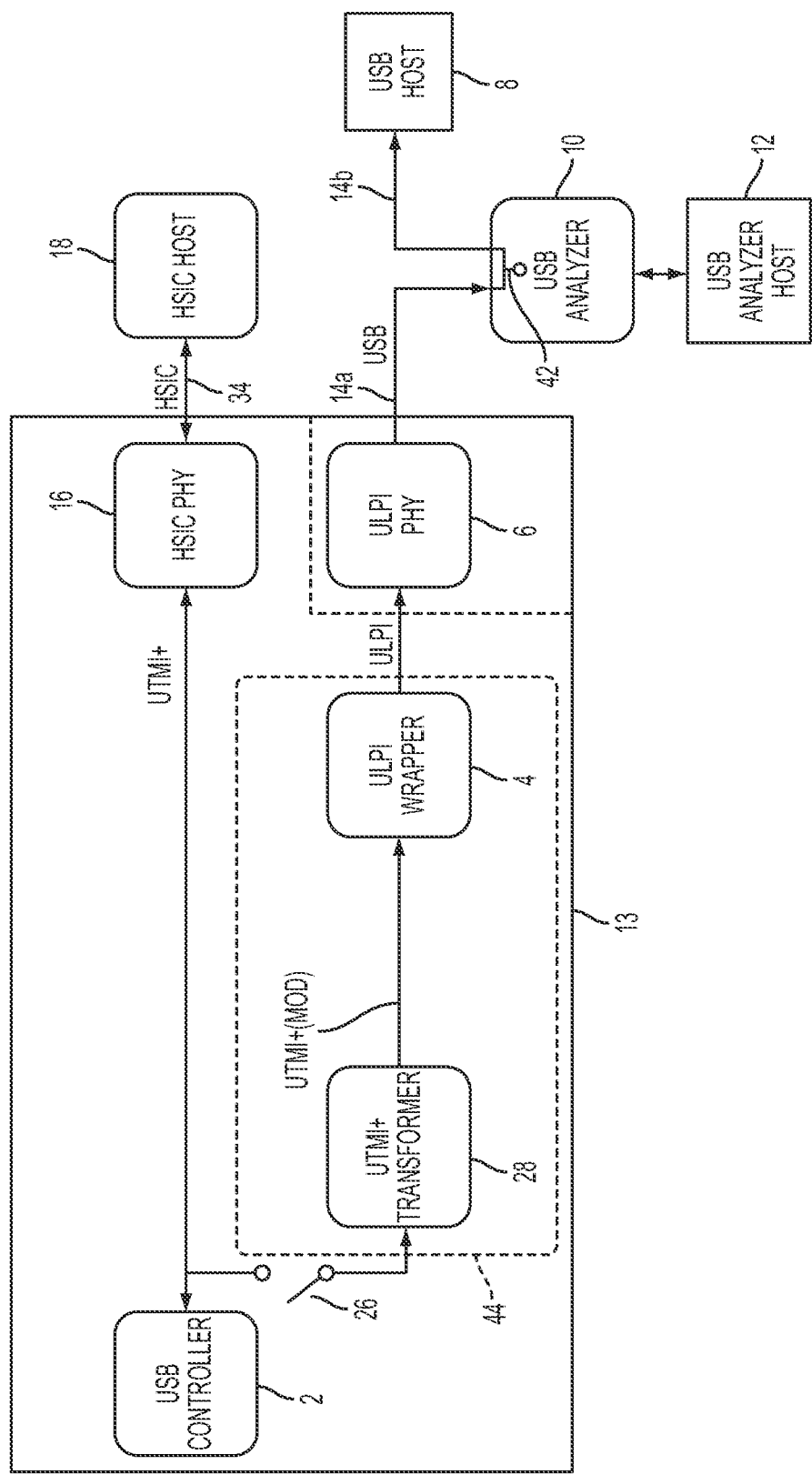
FIG. 5 illustrates a block diagram of a first enhanced USB device connected to a standard HSIC host with a UTMI+ transformer for monitoring and analyzing HSIC signals attached to the interface between the USB controller and HSIC PHY according to an exemplary embodiment.

FIG. 5 illustrates a block diagram of first enhanced USB device 13 connected to a standard HSIC host 18 via HSIC cable 34 with UTMI+ transformer 28 for monitoring or analysis (or "debug") connected between USB controller 2 and HSIC PHY 16 according to an exemplary embodiment. According to further exemplary embodiments, UTMI+ transformer 28 and ULPI wrapper 4 can be integrated into one functional device, but to aid in the description, the different functionalities of each have been kept in separate devices as shown in FIG. 5. As can be seen in FIG. 5, there is no probing of the HSIC signals between HSIC PHY 6 and HSIC host 18. Subsequently, HSIC signal degradation is less of an issue. UTMI+ signals are well known and relatively easy to manipulate. USB controller 2 uses HSIC PHY 16 to communicate with HSIC host 18.

Figure 3:
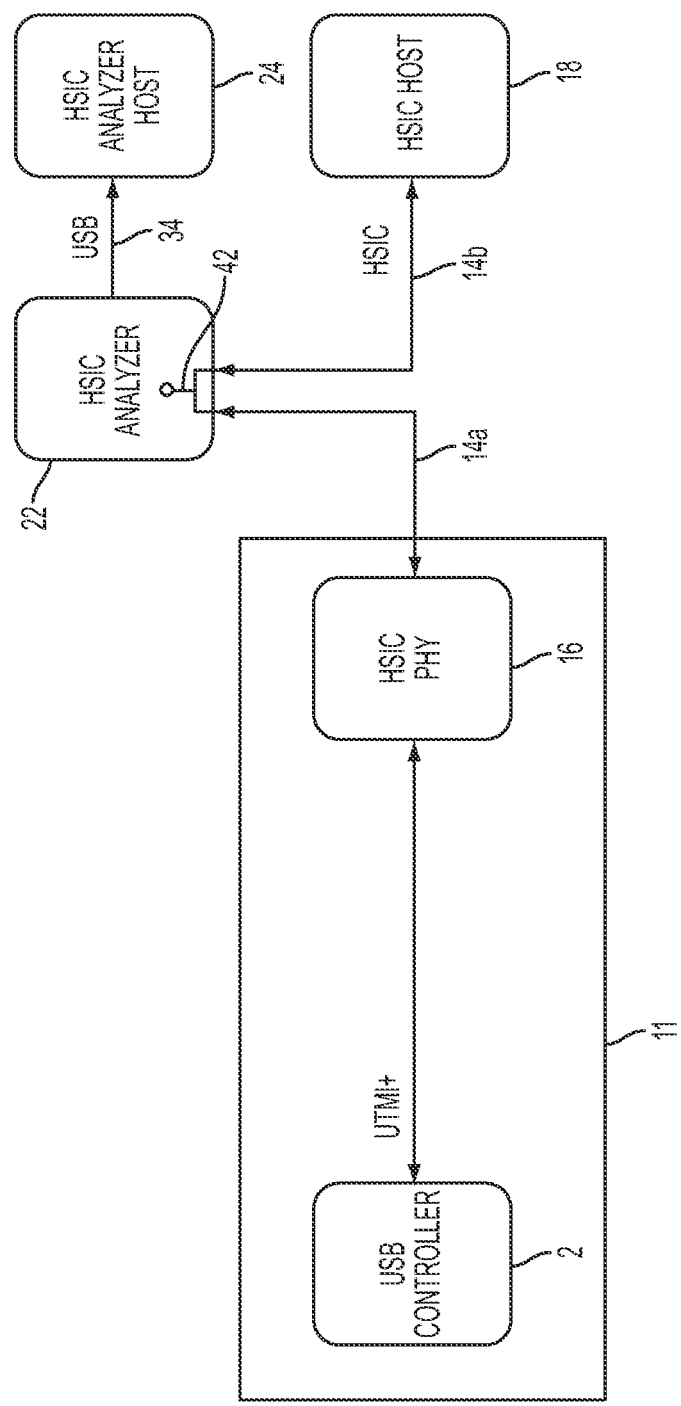
FIG. 3 illustrates a block diagram of a second modified USB device connected to a standard HSIC host with an HSIC analyzer for monitoring and analyzing HSIC signals attached to the interface between the HSIC host and HSIC PHY.

According to exemplary embodiments UTMI+ transformer 28 is a less complex version of HSIC analyzer 22 shown in FIG. 3, or the standard USB analyzer shown in FIG. 1, with additional functional features, described in greater detail below. If monitoring is required of HSIC signals only at certain times, switch 26 can be implemented to connect UTMI+ transformer 28 to the UTMI+ signals between USB controller 2 and HSIC PHY 16. According to a further exemplary embodiment, switch 26 can be omitted and monitoring of the HSIC/UTMI+ signals can occur continuously or as desired through control of USB analyzer 10. All traffic that is present on the HSIC interface (regardless of direction) will also be present on the UTMI+ interface. UTMI+ transformer 28 receives all of the USB traffic on the UTMI+ interface, and transforms the same into a modified form and then forwards the modified UTMI+ signal to ULPI wrapper 4. The output of UTMI+ transformer 28 are UTMI+ (mod) signals. In essence, the UTMI+ signals are modified to account for differences in timing and can, according to a further exemplary embodiments, include accounting for differences in signal levels between transmitted and received signals. According to further exemplary embodiments, such differences in signal levels between UTMI+ and UTMI+ (mod) signals can be compensated for in ULPI wrapper 4. UTMI+ transformer modifies the timing of the received signals, as there are timing differences between the signals transmitted from USB controller 2, those transmitted from HSIC host 18s, and the output of UTMI+ transformer 28. According to further exemplary embodiments, UTMI+ transformer 28 can be represented as performing a UTMI+-to-UTMI+ (mod) signal transformation. The transformation of the signals from UTMI+ to UTMI+ (mod) can include, according to further exemplary embodiments, timing, signal levels, inversion of signals, and data rates, among other transformation properties.

According to further exemplary embodiments, UTMI+ transformer 28 operates as a first-in first-out (FIFO) buffer with additional processes as described herein. Further, UTMI+ transformer 28 operates in a receive mode only with respect to the UTMI+/HSIC signals transmitted between USB controller 2 and HSIC PHY 16. That is, UTMI+ transformer 28 receives UTMI+ signals, transforms them to UTMI+ (mod) signals, and then transmits them. According to further exemplary embodiments, UTMI+ transformer 28 does not transform signals that could be output from ULPI wrapper 4. As those of average skill in the art can appreciate, there is a specified timing relationship between packets (token, data and handshake) that are transmitted by the USB controller 2, and those that are received by the USB controller 2, as UTMI+ signals. In addition, there is also a specified timing relationship for the modified UTMI+ signals transmitted by UTMI+ transformer 28, and the FIFO buffer within UTMI+ transformer 28 performs those timing modifications between UTMI+ signals received from either of USB controller 2 or HSIC PHY 16 and the modified UTMI+ signals that are received from ULPI wrapper 4. According to further exemplary embodiments, the timing modifications include at least modifying one or more of the rate and the gap between the packets to be transmitted by UTMI+ transformer 28 (also referred to as "inter-packet gaps"). As mentioned above, the modification or transforming can be provided through use of a buffer, and in particular, by way of a non-limiting example only, a First-in First-out (FIFO) buffer. According to further exemplar embodiments, the modifications to the timing of the transmitted modified UTMI+ packets or signals can be based on or dependent upon signals that are received by UTMI+ transformer 28. According to exemplary embodiments, UTMI+ transformer 28 operates in a receive-only mode on its input (i.e., the port that is connected to both USB controller 2 and HSIC PHY 16). This is useful when the system is used for test and analysis purposes only, while ULPI wrapper 4 and ULPI PHY 6 can operate in transmit-only mode when used in the configuration shown in FIG. 5 according to exemplary embodiments.

ULPI wrapper 4 converts UTMI+ (mod) traffic to ULPI traffic that is sent to ULPI PHY 6, which then transmits the same to USB analyzer 10. According to an exemplary embodiment, the aforementioned traffic from switch 26 onward is only transmitted out from, as opposed to into, USB controller 2, as indicated by the arrows in FIG. 5. Attempting to receive traffic at ULPI wrapper 4 and forward it through UTMI+ transformer 28 to USB controller 2 in UTMI+ form will not work according to exemplary embodiments because UTMI+ transformer 28 is unidirectional only: that is, it can receive UTMI+ signals from either of USB controller 2 and/or HSIC PHY 16 and transform them into UTMI+ (mod) signals which are then transmitted to ULPI wrapper 4. In other words, there is no UTMI+ (mod)-to-UTMI+ transformation capability in UTMI+ transformer 28.

According to further exemplary embodiments, only USB analyzer 10 is directly connected to ULPI PHY 6. Standard USB host 8 as shown in FIG. 1 is not connected as this would interfere with operation of UTMI+ transformer 28 in monitoring HSIC traffic. However, according to a further exemplary embodiment, USB host 8 can be connected to an output of USB analyzer 10, and can be used as described earlier. According to a further exemplary embodiment, monitoring of HSIC traffic occurs by monitoring ULPI traffic that is transmitted from an ULPI port of ULPI PHY 6. USB analyzer 10 is able to determine the original direction of the HSIC traffic based on knowledge of the lower level USB protocols.

According to exemplary embodiments, monitoring of HSIC traffic occurs between USB controller 2 and HSIC host 18, and modified USB device 13 inside an SoC outputs the HSIC traffic to be monitored on another and existing port of the SoC. The HSIC traffic to be monitored is a result of converting or transforming UTMI+ signals to standard (and robust) USB signaling through use of one or more of UTMI+ transformer 28, ULPI wrapper 4, and ULPI PHY 6. This allows standard USB analysis tools, procedures and know-how to be used to verify operation of the HSIC signals and HSIC host.

According to a further exemplary embodiment, UTMI+ transformer 28 and ULPI wrapper 4 can be configured as one device, referred to as UTMI+ conversion block 44. UTMI+ conversion block 44 can be configured to receive the first and second UTMI+ signals that represent or correspond to the transmitted and received HSIC signals, respectively. UTMI+ conversion block 44, upon receipt of the first and second UTMI+ signals, outputs first and second ULPI signals that are received by ULPI PHY transceiver 6 that is configured to transmit the first and second ULPI signals as first and second USB signals that correspond to the transmitted and received HSIC signals. According to further exemplary embodiments, UTMI+ conversion block 44 can be used in further exemplary embodiments discussed herein, and as shown in the accompanying drawing figures.

According to further exemplary embodiments, capture of high speed USB traffic by USB analyzer 10 can be dependent upon specific signaling requirements that are generally not present in HSIC signals. Thus, the capture of the UTMI+ (mod) signals that represent the HSIC signals requires an awareness that high speed USB handshakes are not present in HSIC signals. Accordingly, if USB analyzer 10 cannot capture high speed USB signals without recognizing the high speed USB handshake signals, then UTMI+ transformer 28 inserts the high speed USB handshake signals when transforming the received UTMI+ signals such that capture of the UTMI+ (mod) signals can occur by USB analyzer 10.

According to a further exemplary embodiment, the method and system described herein use mostly existing building blocks in the SoC. Modifications have been made to one or more existing blocks, and one or more new building blocks have been added. In addition, re-arrangements of one or more existing building blocks allow HSIC monitoring when required with minimal impact to the existing design.

The cost of developing a complex SoC makes it important to be able to use the same SoC for different uses, instead of having physically different versions that cannot be reconfigured by implementing changes through different software versions. Exemplary embodiments discussed herein allow the same SoC to be reconfigured by software for standard USB operation, HSIC operation, or HSIC operation with monitoring with minimal additional logic dedicated to the monitoring. Those of ordinary skill in the art can appreciate that minimizing the introduction of additional devices and logic is important, as monitoring is normally not enabled nor needed in real products, and therefore consumes valuable real estate and power that could be used by devices directly related to the intended function of the device, or simply would allow the device to be produced less expensively.

Figure 6:
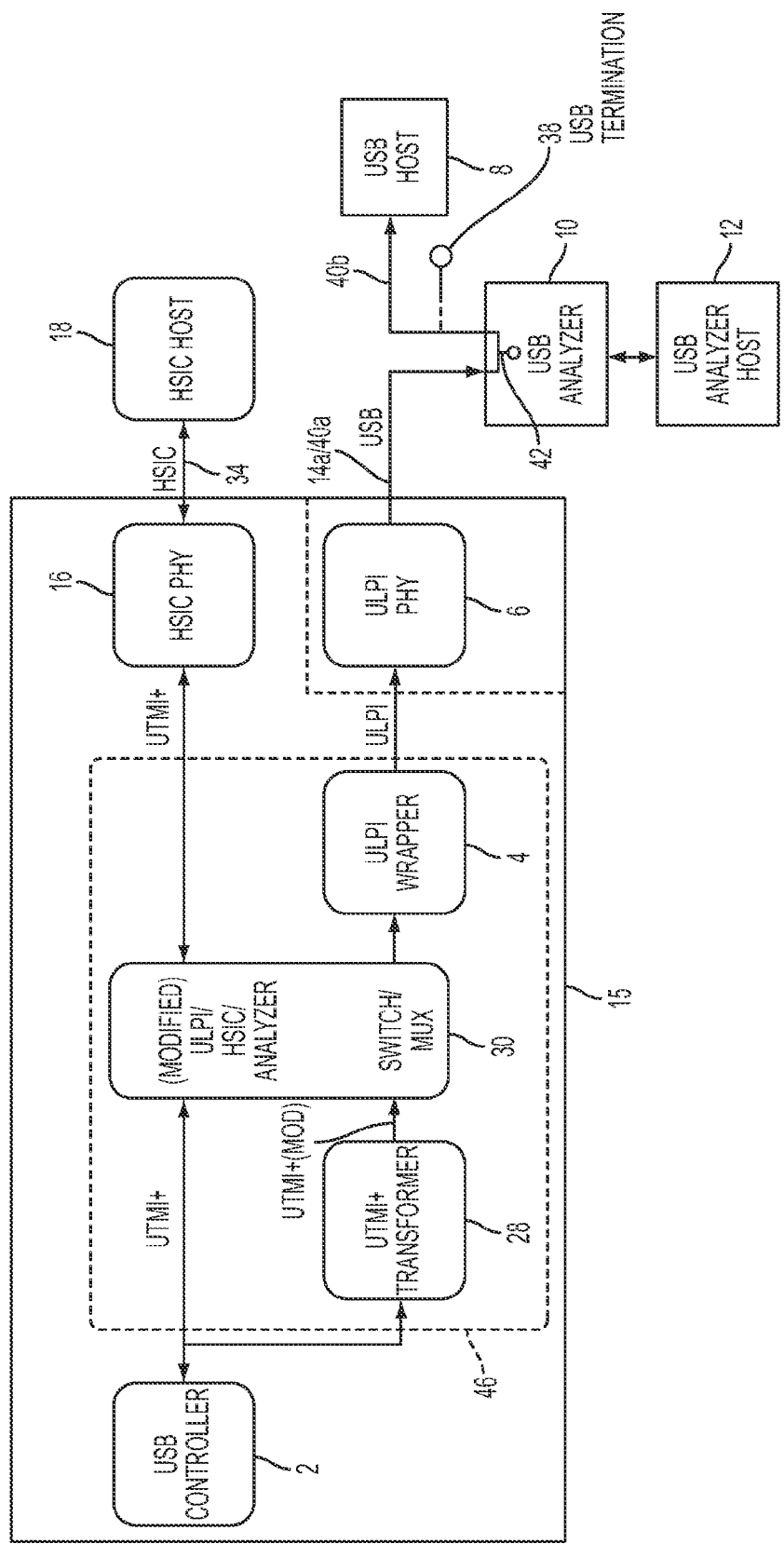
FIG. 6 illustrates a block diagram of a second enhanced USB device connected to a standard HSIC host with a UTMI+ transformer for monitoring and analyzing HSIC signals attached to the interface between the USB controller and HSIC PHY, and also further providing for switching between HSIC operation, standard USB operation, or HSIC operation with HSIC monitoring according to an exemplary embodiment.

FIG. 6 illustrates a block diagram of an implementation of second enhanced USB device 15 connected to standard HSIC host 18 with UTMI+ transformer 28 for debug attached to the interface between USB controller 2 and HSIC PHY 16, and also further providing for switching between HSIC operation, standard USB operation, or HSIC operation with HSIC monitoring according to an exemplary embodiment. The implementation shown in FIG. 6 according to an exemplary embodiment includes USB controller 2, UTMI+ transformer 28, ULPI wrapper 4, HSIC PHY 16, HSIC host 18, ULPI PHY 6, and USB analyzer 10, the output of which, in an exemplary embodiment, can be terminated by USB termination 38, which provides impedance matching. In this case, USB host 8 is not used. According to a further exemplary embodiment, if USB termination 38 is not used (i.e., there is a USB host 8), then modified USB cable 40 is used (in place of USB cable 14a, b) to connect ULPI PHY 6 to USB analyzer 10 and USB analyzer 10 to USB host 8. In modified USB cable 40, the data lines have been opened to prevent communications, but are terminated with resistors to provide impedance matching. Further, this configuration allows power to flow to ULPI PHY 6 under certain ULPI PHY 6 configurations.

Figure 7:
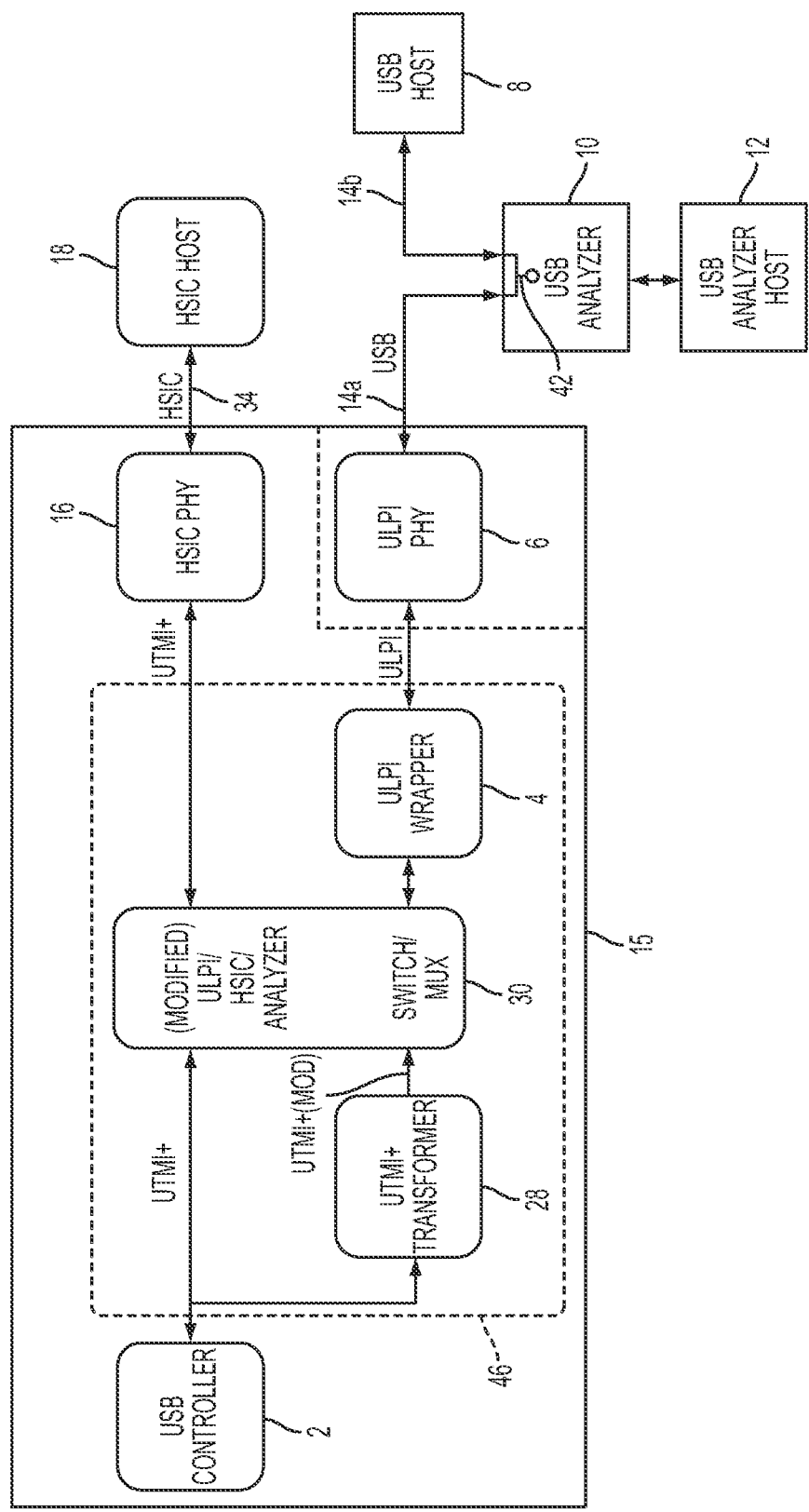
FIG. 7 illustrates a block diagram of the second enhanced USB device shown in FIG. 6 when configured for operation in standard USB operation according to an exemplary embodiment.

The exemplary embodiment of FIG. 6 further includes modified ULPI/HSIC/Analyzer switch/mux (first modified switch/mux) 30 according to a further exemplary embodiment that allows for HSIC operation (i.e., closes path between USB controller 2 and HSIC PHY 16, and an open path between USB controller 2 and ULPI wrapper 4), standard USB operation (opens path between USB controller 2 and HSIC PHY 16, and closes path between USB controller 2 and ULPI wrapper 4; this is shown in greater detail in FIG. 7), or HSIC operation with HSIC monitoring from ULPI PHY 6 (closes path between USB controller 2 and HSIC PHY 16, and closes path between UTMI+ transformer 28 and ULPI wrapper 4). In the mode wherein HSIC operation occurs with HSIC monitoring, the arrows shown in FIG. 6 illustrate the direction of the signals. UTMI+ signals are transmitted by USB controller 2 through first modified switch 30, and are received by HSIC PHY 16, which then transmits HSIC signals. Conversely, the HSIC signals received by HSIC PHY 16 are transmitted as UTMI+ signals through first modified switch 30 to USB controller 2. The same UTMI+ signals that are either transmitted by USB controller 2 or HSIC PHY 16 are received by UTMI+ transformer 28, and are transformed into modified UTMI+ signals that are passed though first modified switch 30 ULPI wrapper 4, the operation of which was discussed in greater detail above.

According to a further exemplary embodiment, UTMI+ transformer 28, first modified switch 30, and ULPI wrapper 4 can be configured as one device, referred to as second UTMI+ conversion block 46. Second UTMI+ conversion block 46 can be configured to receive the first and second UTMI+ signals that represent or correspond to the transmitted and received HSIC signals, respectively. Second UTMI+ conversion block 46, upon receipt of the first and second UTMI+ signals, outputs first and second ULPI signals that are received by ULPI PHY transceiver 6 that is configured to transmit the first and second ULPI signals as first and second USB signals that correspond to the transmitted and received HSIC signals. According to further exemplary embodiments, second UTMI+ conversion block 46 also includes switch functionality, as described above in regard to first modified switch 30.

Standard USB operation occurs when, as shown in FIG. 7 (and described below with respect to FIG. 8), USB controller 2 is connected directly to ULPI wrapper 4 via first modified switch 30 and UTMI+ signals can move between USB controller 2 and ULPI wrapper 4 as indicated by the bi-directional arrows. The same bi-directional flow of USB signals occurs between ULPI wrapper 4, ULPY PHY 6, USB analyzer 10 and USB host 8. In this mode of operation, ULPI wrapper 4 transforms UTMI+ signals to ULPI signals, and vice-versa, which has been described above and is known to those of ordinary skill in the art. Of course, in normal "non-testing/diagnosis mode of operations, USB analyzer 10 and USB analyzer host 12 would not be connected to second modified USB device 15. FIG. 7 also shows use of second UTMI+ conversion block 46, as discussed above in regard to FIG. 6.

Figure 8A:
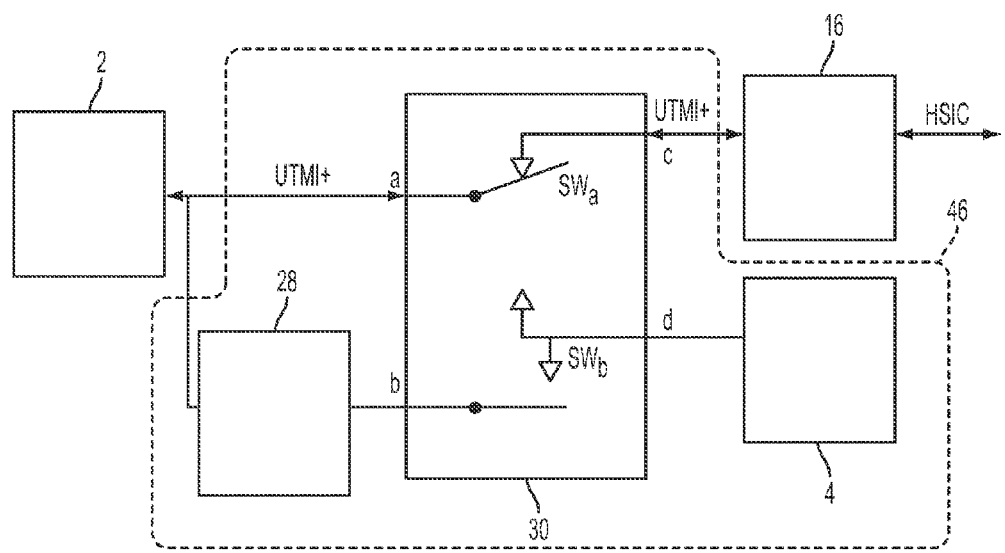
FIGS. 8A-C illustrate block diagrams of a switch that can be used in the circuit for monitoring HSIC communications as shown in FIG. 7 according to an exemplary embodiment.
Figure 8B:
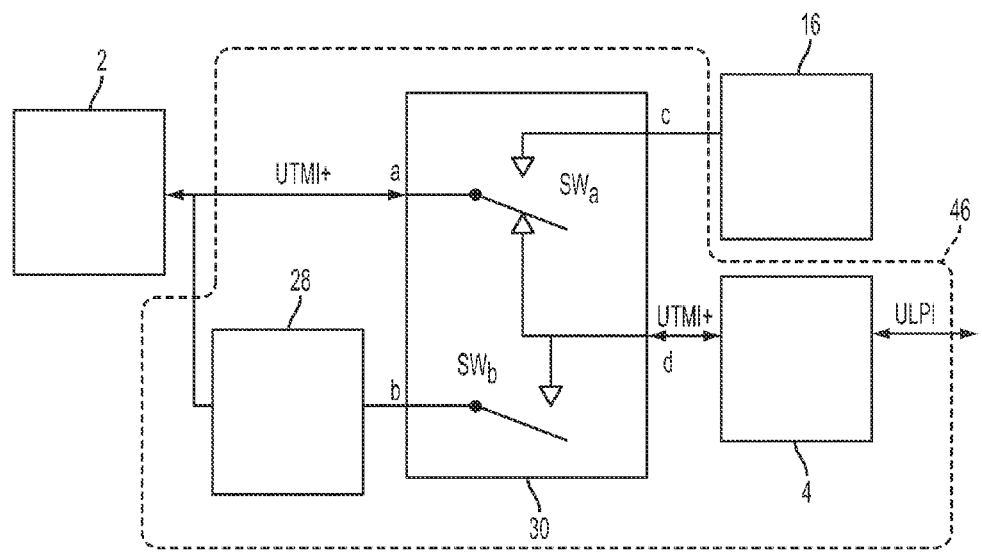
Figure 8C:
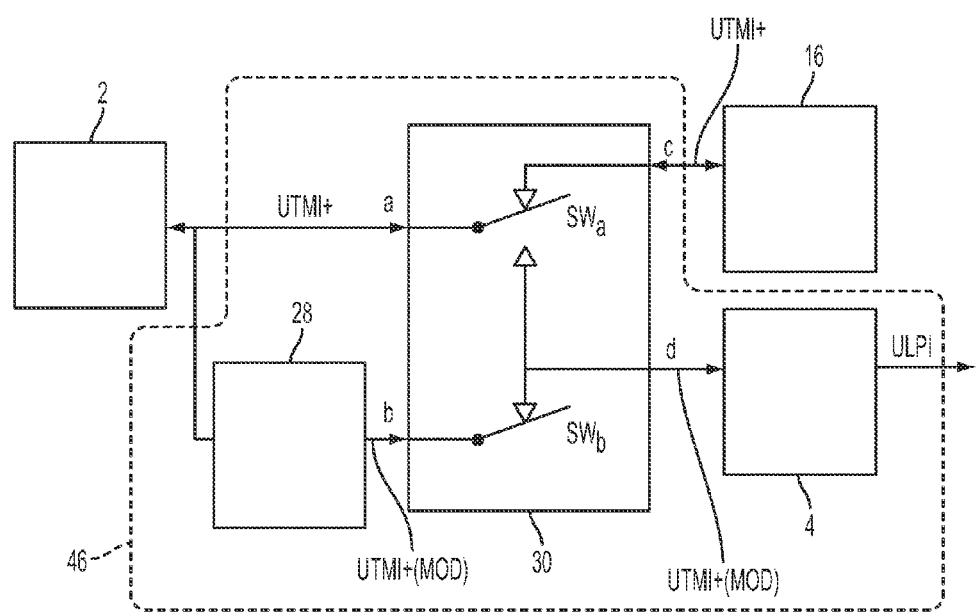

FIGS. 8A-C illustrate conceptual block diagrams of modified switch/mux 30 that can be used in the circuit for monitoring HSIC communications as shown in FIGS. 6 and 7 according to an exemplary embodiment. According to an exemplary embodiment, modified switch/mux 30 can be represented as a first switch, switch (a) that is a double pole, single throw switch that takes the input at terminal a (in this case, the output of USB controller 2), and connects it to either HSIC 16 (output terminal c), or ULPI wrapper 4 (output terminal d). Further, according to exemplary embodiments, a second input at terminal b can be input to a second switch, switch b (a single pole single throw type switch), which can also be selectively provided to output terminal d. Those of ordinary skill can appreciate that the representation shown in FIGS. 8A-C is but only one manner of accomplishing the switching function described above, and that a completely solid state switch/multiplexor or combination of electro-mechanical and integrated circuit devices can be used to perform the same switching functionality.

In a first operating mode, shown in FIG. 8A, first modified switch/mux 30 provides for HSIC operation by closing a path between USB controller 2 and HSIC PHY 16, and opening the path between USB controller 2 and ULPI wrapper 4. Bi directional HSIC signals can now flow between USB controller 2 and HSIC PHY 16, as indicated by lines representing interconnections with the two arrows. Referring to FIG. 8A, terminal a of first modified switch/mux 30 would be connected to terminal c by switch a, and switch b would be open. Thus, in its first operating mode, only HSIC signals are transmitted/received from/by second modified USB device 15. There is no analysis of the HSIC signals, and this can be considered, according to exemplary embodiments, a standard operating mode, such as can be used when second modified USB device 15 is not in test or any other type of diagnosis mode (i.e., "normal" HSIC operation).

In a second operating mode, shown in FIG. 8B, modified switch/mux 30 provides for standard USB operation by opening a path between USB controller 2 and HSIC PHY 16, and closing a path between USB controller 2 and ULPI wrapper 4. Bi directional USB signals can now flow between USB controller 2 and ULPI wrapper 4, as indicated by lines representing interconnections with the two arrows. Referring to FIG. 8B, terminal a of first modified switch/mux 30 would be connected to terminal d by switch a, and switch b would be open. Thus, in its second operating mode, only standard USB signals are transmitted/received from/by second modified USB device 15. Analysis of the USB signals can occur, though not necessarily, and this can be considered, according to exemplary embodiments, a standard operating mode, such as can be used when second modified USB device 15 is not in test or any other type of diagnosis mode (i.e., "normal" USB operation).

In a third operating mode, first modified switch/mux 30 provides for HSIC operation with HSIC monitoring from ULPI PHY 6, by closing a path between USB controller 2 and HSIC PHY 16, and closing a path between UTMI+ transformer 28 and ULPI wrapper 4. Referring to FIG. 8C, terminal a of first modified switch/mux 30 would be connected to terminal c by switch a, and terminal b of first modified switch/mux 30 would be connected to terminal d by switch b. In the third operating mode of first modified switch/mux 30, analysis of the HSIC signals does take place, and this can be considered, according to exemplary embodiments, a diagnostic mode, such as can be used when second modified USB device 15 is in test or diagnosis mode. As shown in FIG. 8C, the bidirectional signal flow is indicated by the lines with the two arrows between USB controller 2 and first modified switch 30, and between first modified switch 30 and HSIC PHY 16. Further, the uni-directional flow of signals from UTMI+ transformer 28 is indicated by the lines with arrows in only one direction, as between UTMI+ transformer 28 and first modified switch 30, and as between first modified HSIC switch 30 and ULPI wrapper 4.

Figure 9:
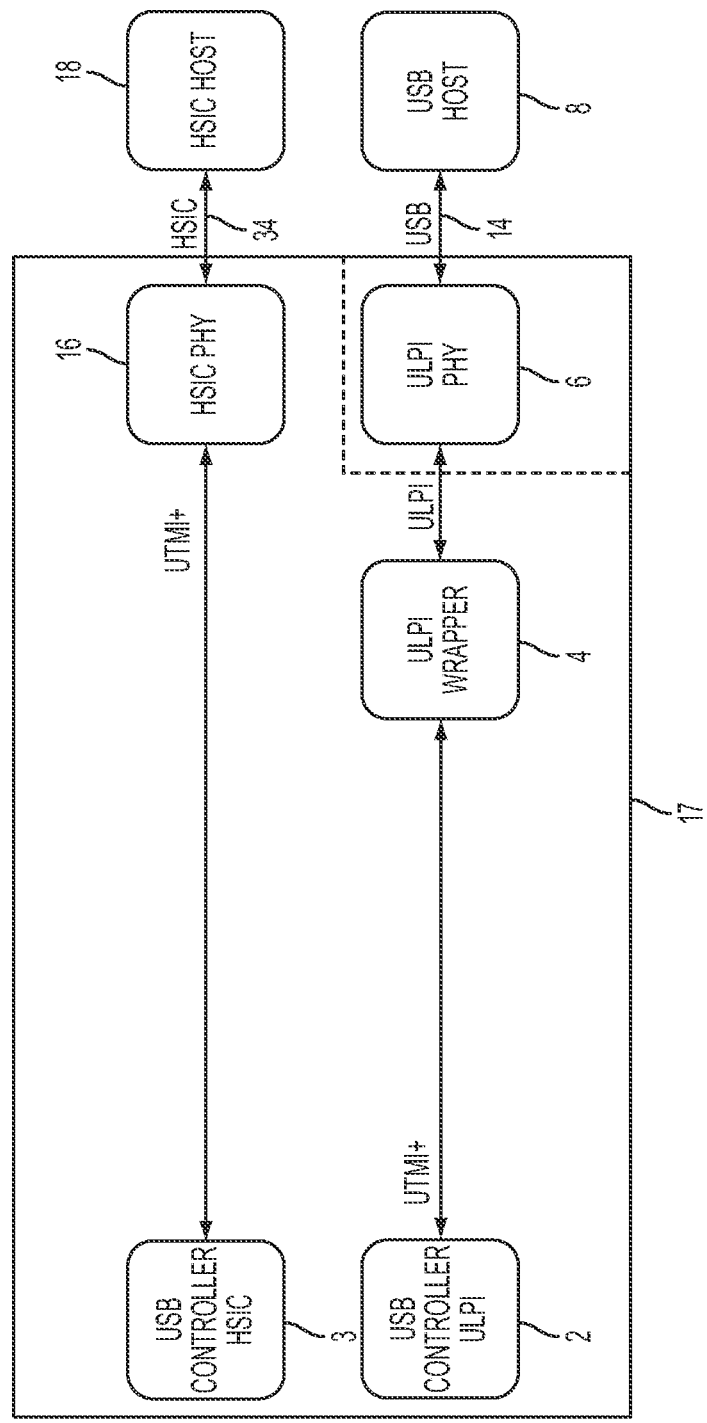
FIG. 9 illustrates a block diagram of a third modified USB device that includes first USB controller and second USB controller, the second USB controller providing HSIC communications and the first USB controller providing standard USB communications, and wherein the first and second USB controllers operate independently of each other such that either type of communications can occur.

Attention is now directed to FIG. 9. FIG. 9 illustrates a block diagram of third modified USB device 17 that includes first USB controller 2 and second USB controller 3, the second USB controller 3 providing HSIC communications and the first USB controller 2 providing standard USB communications, and wherein the first and second USB controllers 2, 3 operate independently of each other such that either type of communications can occur.

SoCs often include 2 USB controllers. Although having two controllers can be very costly to manufacture, as each controller consumes a significant amount of gates on the integrated circuit, in some circumstances it has been shown to be advantageous. The purpose is usually not to allow simultaneous use of both USB and HSIC communications, but rather to use HSIC or standard USB as required on a session-by-session or on a product-by-product basis. That is, second USB enhanced device can be used in several different products, and in a first product both USB and HSIC communications might be reasonably used. In a second product, only HSIC might be used. The reason for a separate USB controller for HSIC is usually that an existing USB controller for ULPI does not support HSIC, so to support both, in some cases, a first and second controller is necessary. Further, modifying the existing SoC design, software and applications previously developed for standard USB for the new HSIC capable USB controller is a major undertaking. Supporting limited USB functionality for the first generation(s) of HSIC products allows faster time to market for a quite small increase in complexity in the SoC.

Figure 10:
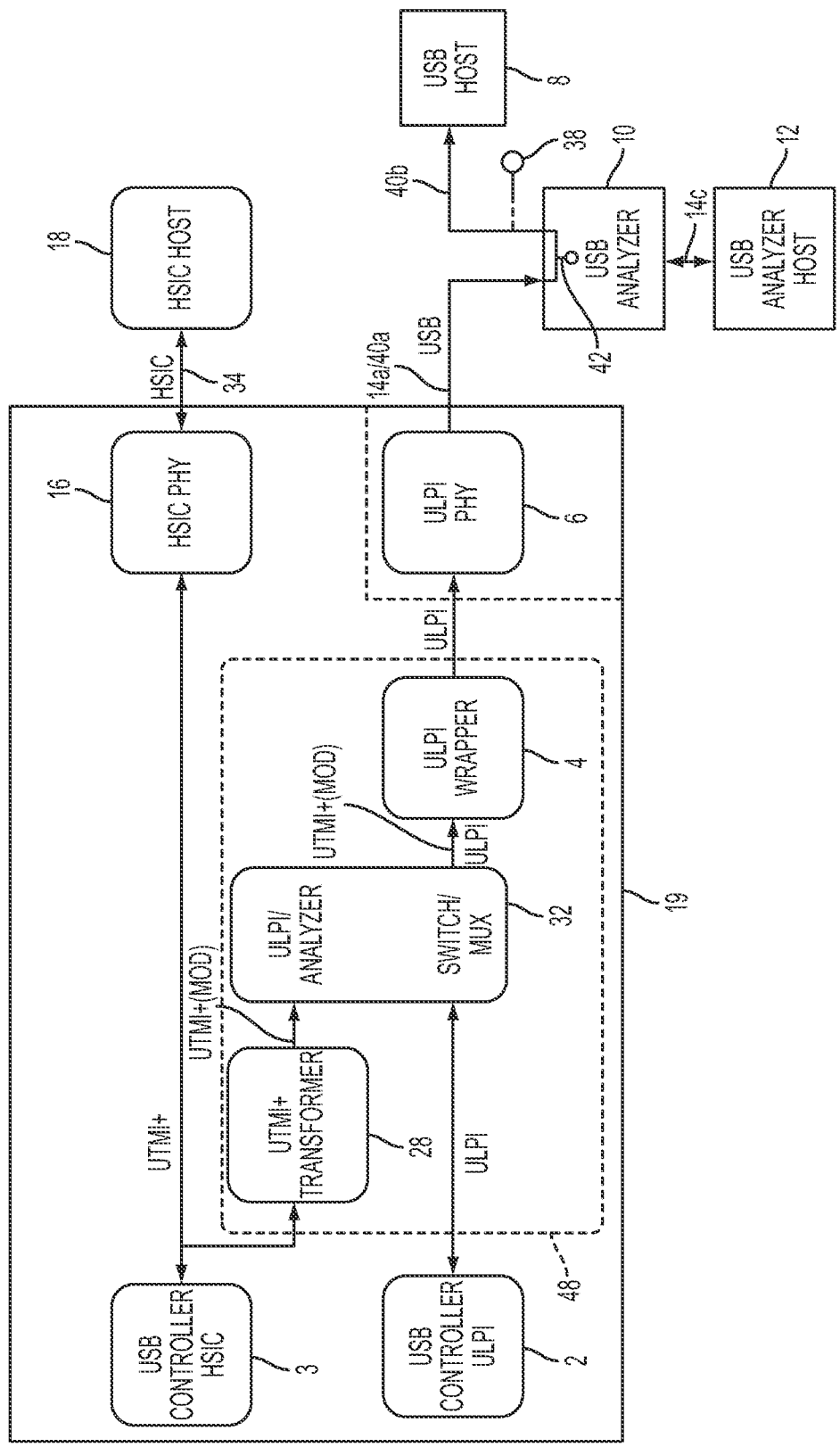
FIGS. 10 and 11 illustrate block diagrams of a third enhanced USB device that includes both a first and second USB controller, the second USB controller providing HSIC communications and the first USB controller providing standard USB communications, and further including a second modified switch for allowing HSIC operation with and without analysis and testing capabilities according to exemplary embodiments.

According to an exemplary embodiment, an SoC implementation with separate USB controllers for standard USB and HSIC can be modified as shown in FIG. 10 to incorporate testing of HSIC signals. FIG. 10 illustrates a block diagram of third enhanced USB device 19, operating in a first mode, which includes first USB (ULPI) controller 2 and second USB (HSIC) controller 3, wherein HSIC controller 3 provides HSIC communications and first USB controller 2 provides standard USB communications. First and second USB controllers 2, 3 operate independently of each other such that either type of communications can occur according to further exemplary embodiments.

As shown in FIG. 10, UTMI+ transformer 28 is connected to the output of HSIC controller 3 (which outputs a UTMI+ type signal) and the output of UTMI+ transformer 28 (UTMI+ (mod)) is connected to ULPI wrapper 4 through second modified switch/mux 32. The output of ULPI wrapper 4, which is a ULPI signal, is input into ULPI PHY 6. HSIC controller 3 and HSIC PHY 16 are connected together, and the HSIC PHY transmits and receives to and from HSIC host 18, as shown and discussed above. Third enhanced USB device 19 further includes USB controller 2, which is connected to second modified switch/mux 32. USB analyzer 10 is connected to ULPI PHY 6, and then USB analyzer host 12 is connected to USB analyzer 10 to provide the ability to test both standard USB signals and the HSIC signals, according to exemplary embodiments discussed herein.

The implementation shown in FIG. 10 according to an exemplary embodiment includes USB analyzer 10, the output of which, in an exemplary embodiment, can be terminated by USB termination 38, which provides impedance matching. In this case, USB host 8 is not used. According to a further exemplary embodiment, if USB termination 38 is not used (i.e., there is a USB host 8), then modified USB cable 40 is used (in place of USB cable 14a, b) to connect ULPI PHY 6 to USB analyzer 10 and USB analyzer 10 to USB host 8. In modified USB cable 40, the data lines have been opened to prevent communications, but are terminated with resistors to provide impedance matching. Further, this configuration allows power to flow to ULPI PHY 6 under certain ULPI PHY 6 configurations.

According to a further exemplary embodiment, UTMI+ transformer 28, Second modified switch/mux 32, and ULPI wrapper 4 can be configured as one device, referred to as third UTMI+ conversion block 48. Third UTMI+ conversion block 48 can be configured to receive the first and second UTMI+ signals that represent or correspond to the transmitted and received HSIC signals, respectively. Third UTMI+ conversion block 48, upon receipt of the first and second UTMI+ signals, outputs first and second ULPI signals that are received by ULPI PHY transceiver 6 that is configured to transmit the first and second ULPI signals as first and second USB signals that correspond to the transmitted and received HSIC signals. According to further exemplary embodiments, third UTMI+ conversion block 48 also includes switch functionality, as described below in regard to second modified switch/mux 32.

Figure 11:
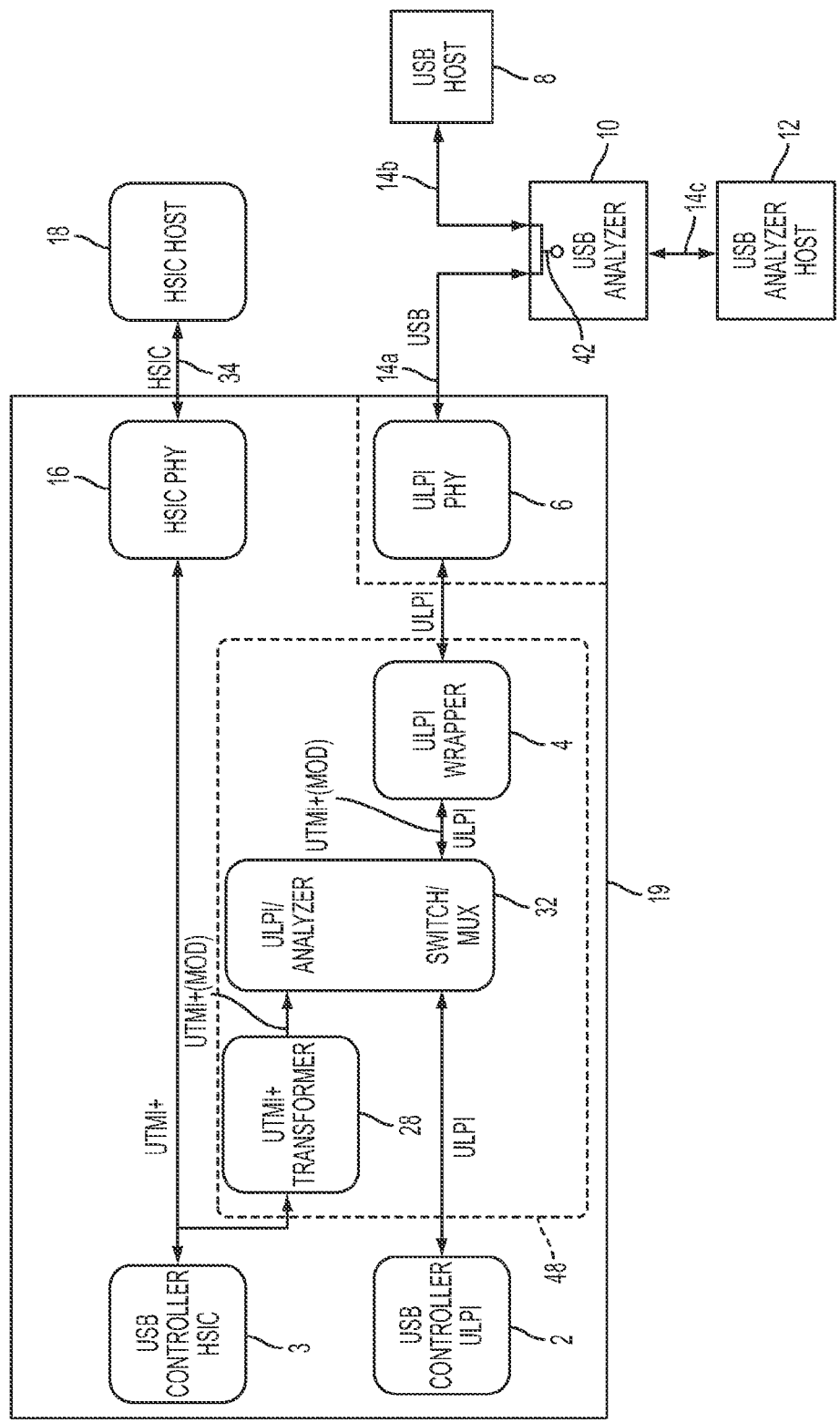
Figure 12A:
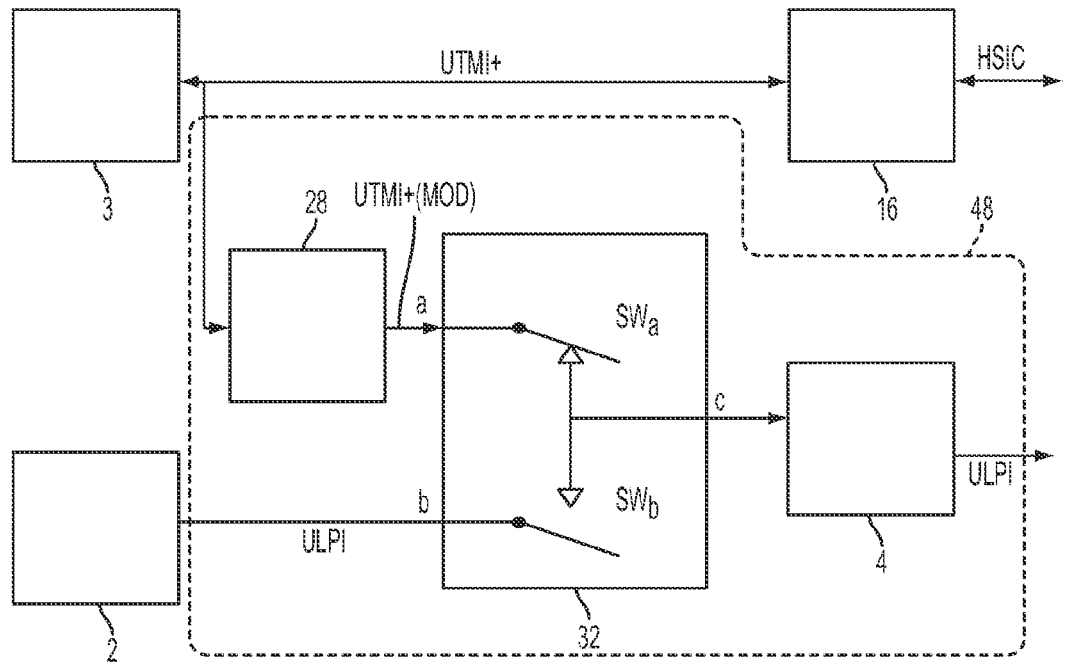
FIG. 12 illustrates a block diagram of another modified switch that can be used in the circuit for monitoring HSIC communications as shown in FIGS. 10-11 according to an exemplary embodiment.
Figure 12B:
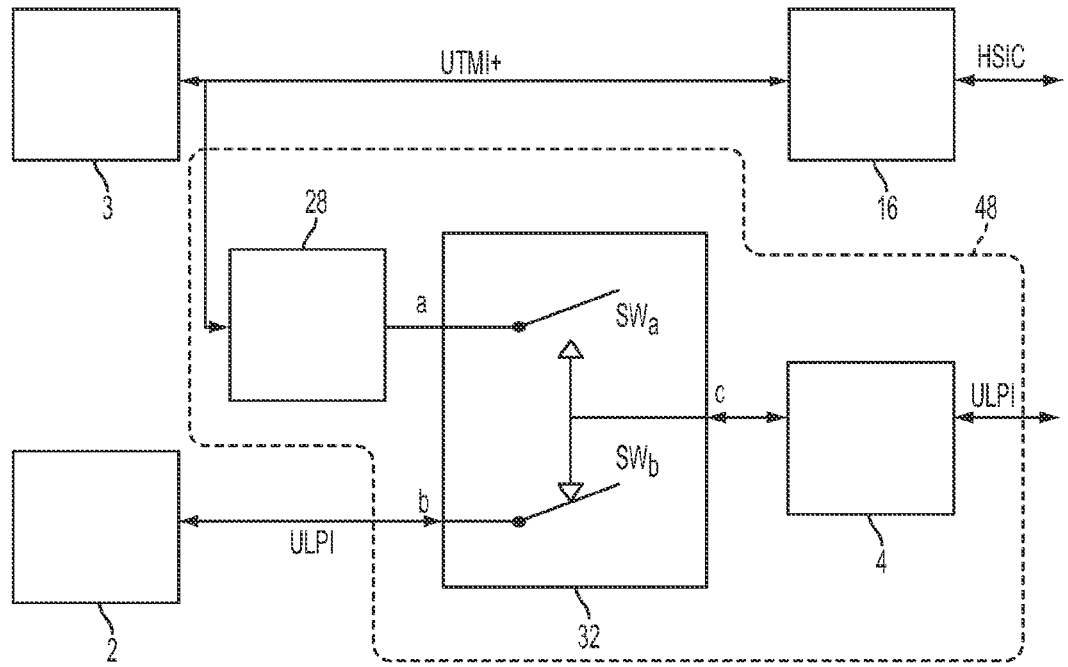

Second modified switch/mux 32, similar to first modified switch/mux 30, operates to channel its inputs to different outputs depending on the desired functionality. According to exemplary embodiments, second modified switch/mux 32 can be implemented as that shown in FIGS. 12A and 12B, wherein FIG. 12A represents a first mode of operation, as used third enhanced USB device 19, shown in FIG. 10. FIGS. 12A and 12B illustrate block diagrams of an exemplary embodiment of second modified switch/mux 32 that can be used in the circuit for monitoring HSIC communications as shown in FIGS. 10 and 11, respectively. According to an exemplary embodiment, modified switch/mux 32, operating in a first mode, as shown in FIG. 12A, can be represented as a first switch, switch (a), which is a single pole, single throw switch that allows a signal input at terminal a (in this case, the output of UTMI+ transformer 28), to be transmitted to ULPI wrapper 4 (output terminal c) and visa-versa. In the first mode, modified UTMI+ signals are output from UTMI+ transformer 28 and input to terminal a of second modified switch/mux 32 and output to ULPI wrapper 4. This mode of operation is one in which the UTMI+ signals are monitored as USB signals, as discussed above, and is signified by the interconnections with only one arrow indicating the flow of the signals as shown in FIG. 10. UTMI+ signals from USB controller 3, or HSIC PHY 16 are received by UTMI+ transformer 28, and then are sent to modified switch/mux 32 and then to ULPI wrapper 4.

Referring to FIGS. 11 and 12B, and according to a further exemplary embodiment, a signal at terminal b can be input to a second switch, switch b, which is also a single pole single throw type switch. Switch b connects terminal b to terminal c. Therefore a signal present at terminal b can be connected to terminal c, and visa-versa. Therefore, either terminal a, or terminal b and any signals present at each can be connected to terminal c at a time (and visa-versa). Thus, according to an exemplary embodiment, in a second operating mode, standard USB type signals can be input to USB analyzer 10 or third enhanced device 19 can be used in a standard USB fashion. The second mode of operation of second modified switch/mux 32 is one in which standard USB signals can be transmitted and received by third enhanced USB device 19, and is indicated by the interconnections lines with the two arrows, meaning the signals can flow in both directions. For example, as shown in FIG. 11, USB signals can be received by ULPI PHY 6, converted to ULPI signals, and transmitted to ULPI wrapper 4, which then outputs ULPI signals to switch 32 which transfers them to USB controller 2. Therefore, this is the case in which if testing and diagnosis is desired, it can be accomplished for either of the USB standard signals, or HSIC type signals, but not both at the same time. However, those of ordinary skill in the art can appreciate that this is but one particular implementation of the exemplary embodiments and the general inventive concepts, and that other embodiments, not specifically discussed for the dual purposes of clarity and brevity, can include a switching matrix that can provide multiple outputs, and/or allow both types of signals to be output simultaneously if desired.

Furthermore, those of ordinary skill can appreciate that the representation shown in FIGS. 12A and 12B are but only one manner of accomplishing the switching function described above, and that a completely solid state switch/multiplexor or combination of electro-mechanical and integrated circuit devices can be used to perform the same switching functionality.

Figure 4:
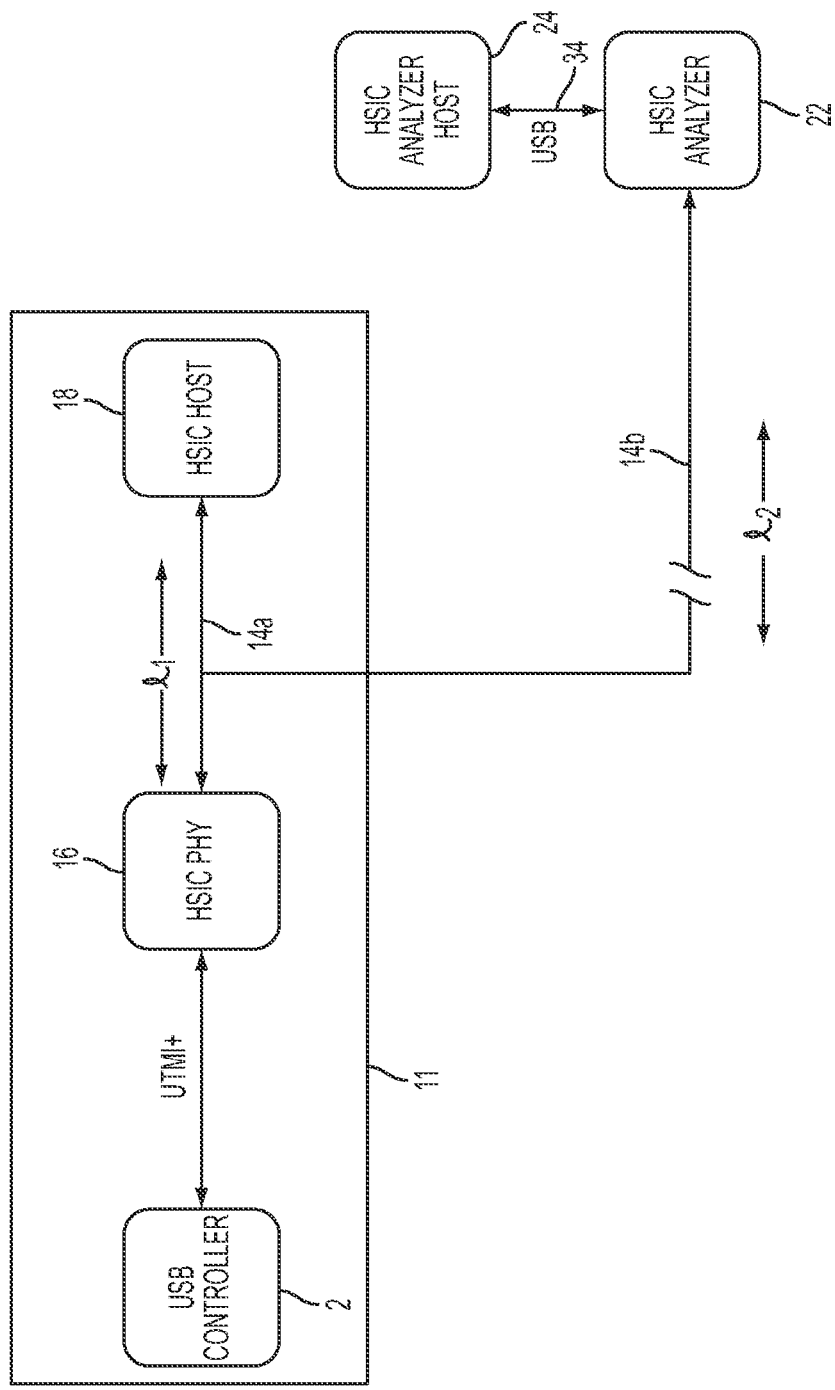
FIG. 4 illustrates a block diagram of a third modified USB device connected to a standard HSIC host with an HSIC analyzer for monitoring and analyzing HSIC signals attached to the interface between the HSIC host and HSIC PHY.
Figure 13:
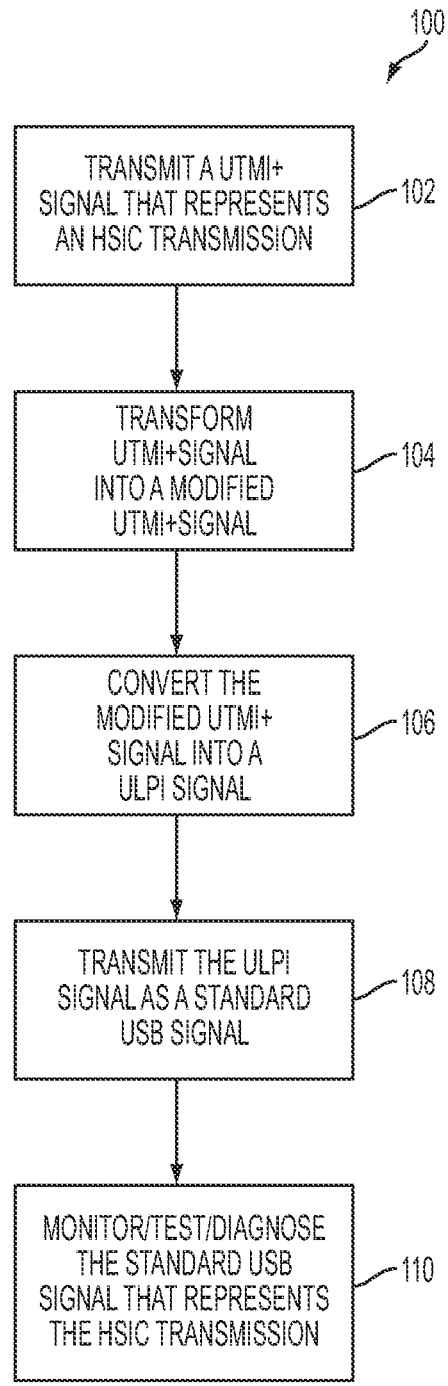
FIG. 13 illustrates a flow chart of a method for monitoring/testing/diagnosing standard USB signals that represent HSIC transmissions according to exemplary embodiments.

FIG. 13 illustrates a flow chart of method 100 for monitoring/testing/diagnosing standard USB signals that represent HSIC transmissions according to exemplary embodiments. Method 100 represents but one exemplary embodiment of the general inventive concept, and illustrates the basic operations (and corresponds to FIG. 4) that are equally applicable to the systems shown in FIGS. 5-7, and 10-11.

Method 100 begins with step 102, wherein a UTMI+ signal is generated that can be transmitted as an HSIC signal if it is input into HSIC PHY 16, or it can be transmitted as a standard USB signal if it is input into ULPI wrapper 4. Therefore, by converting it into a standard USB signal, which is relatively easier to monitor than HSIC signals, the original HSIC transmission can be effectively monitored, meaning that complete diagnosing and testing of the HSIC signals can occur according to exemplary embodiments. Following step 102, in step 104, method 100 proceeds to transform the UTMI+ signal into a modified form, UTMI+ (mod), which can be converted into a ULPI signal in step 106. The transformation of the UTMI+ signal into modified UTMI+ (mod) signal takes places, according to an exemplary embodiment, in UTMI+ transformer 28, as discussed in greater detail above. The transformation of the signals from UTMI+ to UTMI+ (mod) can include, according to further exemplary embodiments, timing, signal levels, inversion of signals, and data rates, among other transformation properties. Once the transformation of the UTMI+ signal occurs, in step 104, method 100 proceeds to step 106, wherein the UTMI+ (mod) signal is converted into a ULPI signal, usually by ULPI wrapper 4 (though, as discussed above, UTMI+ transformer 28 and wrapper 4 can be combined into one integrated circuit device).

After conversion by ULPI wrapper 4, the ULPI signal is output from the physical SoC to ULPI PHY 6, and transmitted as a standard USB signal, as shown in step 108. The standard USB signal can then be monitored/tested/diagnosed in step 110 of method 100. Such monitoring, testing, and/or diagnosing has been described in detail above, and will not be repeated again for the dual purposes of clarity and brevity. However, the monitoring, testing, and/or diagnosing of the standard USB signal at step 110 in effect is a monitoring, testing and/or diagnosing of the HSIC signal that can be transmitted from HSIC PHY 16. Thus, through the use of the exemplary embodiments, use of extremely sophisticated, expensive, and ultimately unreliable test equipment that can monitor, test and/or diagnose HSIC signals is eliminated, and standard USB testing equipment can be used, with all of the pre-existing functionality that is currently available.

According to an exemplary embodiment, implementation of method 100 can occur in a dedicated processor (not shown in any of the figures), or through one or more of the functional blocks shown in FIGS. 5-7, and 10-11. Those of ordinary skill in the art of the general inventive concept can appreciate that such functionality can be designed into various types of circuitry, including, but not limited to field programmable gate array structures (FGPAs), application specific integrated circuitry (ASICs), microprocessor based systems, among other types. A detailed discussion of the various types of physical implementations does not substantively aid in an understanding of the general inventive concepts, and as such has been omitted for the dual purposes of brevity and clarity. However, as well known to those of ordinary skill in the art, the systems and methods discussed herein can be implemented as discussed, and can further include programmable devices.

Such programmable devices and/or other types of circuitry as previously discussed can include a processing unit, a system memory, and a system bus that couples various system components including the system memory to the processing unit. The system bus can be any of several types of bus structures including a memory bus or memory controller, a peripheral bus, and a local bus using any of a variety of bus architectures. Furthermore, various types of computer readable media can be used to store programmable instructions. Computer readable media can be any available media that can be accessed by the processing unit. By way of example, and not limitation, computer readable media can comprise computer storage media and communication media. Computer storage media includes volatile and nonvolatile as well as removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by the processing unit. Communication media can embody computer readable instructions, data structures, program modules or other data in a modulated data signal such as a carrier wave or other transport mechanism and can include any suitable information delivery media.

The system memory can include computer storage media in the form of volatile and/or nonvolatile memory such as read only memory (ROM) and/or random access memory (RAM). A basic input/output system (BIOS), containing the basic routines that help to transfer information between elements connected to and between the processor, such as during start-up, can be stored in memory. The memory can also contain data and/or program modules that are immediately accessible to and/or presently being operated on by the processing unit. By way of non-limiting example, the memory can also include an operating system, application programs, other program modules, and program data.

The processor can also include other removable/non-removable and volatile/nonvolatile computer storage media. For example, the processor can access a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive can be connected to the system bus through a non-removable memory interface such as an interface, and a magnetic disk drive or optical disk drive can be connected to the system bus by a removable memory interface, such as an interface.

The present general inventive concept can also be embodied as computer-readable codes on a computer-readable medium. The computer-readable medium can include a computer-readable recording medium and a computer-readable transmission medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

The above-described exemplary embodiments are intended to be illustrative in all respects, rather than restrictive, of the present invention. Thus the present invention is capable of many variations in detailed implementation that can be derived from the description contained herein by a person skilled in the art. No element, act, or instruction used in the description of the present application should be construed as critical or essential to the invention unless explicitly described as such. Also, as used herein, the article "a" is intended to include one or more items.

What is claimed is:

1. A system enabling to monitor high speed interchip (HSIC) signals, using universal serial bus (USB) signals corresponding to the HSIC signals, the system comprising:
    a USB controller configured to output first USB transceiver macro-cell (UTMI+) signals;
    an HSIC PHY transceiver configured
        to receive the first UTMI+ signals from the USB controller, and to convert the received first UTMI+ signals into first HSIC signals, and to transmit the first HSIC signals outside the system, and
        to receive second HSIC signals input to the system, to convert the second HSIC signals into second UTMI+ signals, and to transmit the second UTMI+ signals to the USB controller;
    a UTMI+ conversion block configured to receive the first and second UTMI+ signals, to transform the received first and second UTMI+ signals into corresponding first and second UTMI+ low pin count interface (ULPI) signals, and to transmit the first and second ULPI signals, the first and second ULPI signals being equivalent to the first and second HSIC signals; and
    a ULPI PHY transceiver configured to receive the first and second ULPI signals, to convert the first and second ULPI signals into corresponding first and second USB signals, and to transmit the first and second USB signals outside the system.

2. The system according to claim 1, wherein the UTMI+ conversion block comprises:
    a UTMI+ transformer configured to receive the first and second UTMI+ signals and modify the received first and second UTMI+ signals into first and second modified UTMI+ signals, and output the modified first and second UTMI+ signals; and
    a UTMI+ low pin count interface (ULPI) wrapper configured to receive the first and second modified UTMI+ signals from the UTMI+ transformer and convert the received modified first and second UTMI+ signals into the first and second ULPI signals.

3. The system according to claim 2 wherein the UTMI+ transformer is configured to transform at least timing of the received first and second UTMI+ signals, wherein such timing transformation includes inter-packet gap modifications of the received first and second UTMI+ signals.

4. The system according to claim 1, wherein the UTMI+ conversion block is further configured to generate a standard high speed USB handshake signal such that a USB analyzer, when operably connected to receive the first and second USB signals, can capture the first and second USB signals.

5. The system according to claim 1, further comprising:
    a switch configured to close a path between the USB controller and the UTMI+ conversion block and between the HSIC PHY transceiver and the UTMI+ conversion block, such that the first and second UTMI+ signals can be received by the UTMI+ conversion block, and the switch is further configured to open the path such that the first and second UTMI+ signals cannot be received by the UTMI+ conversion block.

6. A system enabling to monitor both universal serial bus (USB) and high speed interchip (HSIC) signals, the system comprising:
    a first multiplexer configured to operate in at least two configurations,
    a USB controller configured to output first USB transceiver macro-cell (UTMI+) signals;
    an HSIC PHY transceiver configured, when the first multiplexer operates in a first configuration, to receive the first UTMI+ signals from the USB controller, to convert the first UTMI+ signals into first HSIC signals, and to transmit the first HSIC signals outside the system, and to receive second HSIC signals input to the system, to convert the second HSIC into second UTMI+ signals, and to transmit the second UTMI+ signals to the USB controller; and
    a UTMI+ conversion block configured to receive the first and second UTMI+ signals, to transform the received first and second UTMI+ signals into corresponding first and second ULPI signals, and to transmit the first and second ULPI signals, the first and second ULPI signals being usable to monitor the first and second HSIC signals.

7. The system according to claim 6, wherein
the first multiplexer is configured to operate in the first configuration when the first multiplexer receives the first and second UTMI+ signals, and the received first UTMI+ signals transmitted by the USB controller are output to the HSIC PHY transceiver to be transmitted as the first HSIC signals, and further the received second UTMI+ signals are output to the USB controller.

8. The system according to claim 6,
wherein the UTMI+ conversion block comprises:
    a UTMI+ transformer configured to receive the first and second UTMI+ signals and modify the received first and second UTMI+ signals into first and second modified UTMI+ signals, and output the modified first and second UTMI+ signals;
    a UTMI+ low pin count interface (ULPI) wrapper configured to receive the first and second modified UTMI+ signals from the UTMI+ transformer and convert the received modified first and second UTMI+ signals into the first and second ULPI signals, and
wherein the first multiplexer is further configured to receive the first and second UTMI+ signals and to operate in a second configuration that includes operation of the first configuration, and received first and second modified UTMI+ signals are output to the ULPI wrapper; and a ULPI PHY transceiver configured to receive the first and second ULPI signals and transmit corresponding first and second USB signals.

9. The system according to claim 8, wherein the UTMI+ transformer is configured to transform at least timing of the received first and second UTMI+ signals, wherein such timing transformation includes inter-packet gap modifications of the received first and second UTMI+ signals.

10. The system according to claim 8, wherein the UTMI+ transformer is further configured to generate a standard high speed USB handshake signal such that a USB analyzer, when operably connected to receive the first and second USB signals, can capture the first and second USB signals.

11. The system according to claim 6, further comprising:

a UTMI+ low pin count interface (ULPI) wrapper configured to receive the first UTMI+ signals and to transmit corresponding first ULPI signals, and further wherein the ULPI wrapper is further configured to receive second ULPI signals and to transmit corresponding third UTMI+ signals to the USB controller when the first multiplexer alternatively operates in the third configuration such that the HSIC PHY transceiver cannot transmit second UTMI+ signals to the USB controller; and a ULPI PHY transceiver configured to receive first ULPI signals and transmit corresponding first USB signals, and to receive second USB signals and transmit corresponding second ULPI signals to the ULPI wrapper.

12. The system according to claim 11, further comprising:

a USB analyzer configured to monitor the transmitted corresponding first and second USB signals, whereby an analysis of the first and second HSIC signals can be performed via the first and second USB signals; and a USB analyzer host configured to perform at least one of control of the USB analyzer, receive original data corresponding to the first and second USB signals from the USB analyzer, process the original data received from the USB analyzer, and store original and processed data.

13. A system enabling to monitor high speed interconnect (HSIC) signals output by and input to the system, using universal serial bus (USB) signals corresponding to the HSIC signals, the device comprising:

a first USB controller configured to output first USB transceiver macro-cell (UTMI+) signals;

an HSIC PHY transceiver configured to receive the first UTMI+ signals from the first USB controller, to convert the received first UTMI+ signals into first HSIC signals, and to transmit the first HSIC signals outside the system, and to receive second HSIC signals, to convert the second HSIC signals into second UTMI+ signals, and to transmit the second UTMI+ signals to the first USB controller;

a UTMI+ transformer configured to receive the first and second UTMI+ signals, to modify the received first and second UTMI+ signals into first and second modified UTMI+ signals, and to output the modified first and second UTMI+ signals;

a switch configured to operate in at least two modes, wherein in a first mode the switch is configured to receive both the modified first and second UTMI+ signals and to output either of the received modified first and second UTMI+ signals; and a UTMI+ low pin count interface (ULPI) wrapper configured to receive the first and second modified UTMI+ signals from the switch, to convert the received modified first and second UTMI+ signals into the first and second ULPI signals.

14. The system according to claim 13, wherein the UTMI+ transformer is configured to transform at least timing of the received first and second UTMI+ signals, wherein such timing transformation includes inter-packet gap modifications of the received first and second UTMI+ signals.

15. The system according to claim 13, further comprising:

a ULPI PHY transceiver configured to receive the first and second ULPI signals and transmit corresponding first and second USB signals.

16. The system according to claim 13, wherein the UTMI+ transformer is further configured to generate a standard high speed USB handshake signal such that the USB analyzer can capture high speed USB signals transmitted by the ULPI PHY transceiver.

17. The system according to claim 13, further comprising:

a ULPI PHY transceiver configured to receive ULPI signals and transmit corresponding USB signals, and is further configured to receive USB signals and transmit corresponding ULPI signals; and a second USB controller configured to output third UTMI+ low pin count interface (ULPI) signals, and wherein, the first switch is further configured to operate in a second mode such that signals received by the HSIC PHY transceiver are not transmitted to the first USB controller, and further wherein, while the first switch is operating in the second mode, the third ULPI signals transmitted by the second USB controller are received by the first switch and output to the ULPI wrapper that receives the third ULPI signals and transfers the third ULPI signals to the ULPI PHY transceiver to output corresponding third USB signals, and further wherein the ULPI PHY transceiver receives fourth USB signals and outputs fourth ULPI signals to the ULPI wrapper, wherein the ULPI wrapper outputs the fourth ULPI signals to the second USB controller through the first switch.

18. A method for monitoring high speed interconnect (HSIC) signals output by and input to a device, using universal serial bus (USB) signals corresponding to the HSIC signals, the method comprising: receiving USB transceiver macro-cell (UTMI+) signals at a UTMI+ conversion block, wherein the UTMI+ signals represent HSIC signals; transforming the received UTMI+ signals into UTMI+ low pin count interface (ULPI) signals; and transmitting the ULPI signals as standard USB signals, wherein the transmitted USB signals are equivalent to the HSIC signals received by the UTMI+ conversion block, wherein the step of receiving UTMI+ signals comprises receiving UTMI+ signals transmitted from at least one of a USB controller and an HSIC PHY transceiver, the UTMI+ signals transmitted by the USB controller are received by the HSIC PHY transceiver and output as HSIC signals, and further wherein the UTMI+ signals transmitted by the HSIC PHY transceiver are received by the HSIC PHY transceiver as HSIC signals.

19. The method according to claim 18, wherein the step of transforming comprises:

transforming at least timing of the received first and second UTMI+ signals, wherein such timing transformation includes inter-packet gap modifications of the received first and second UTMI+ signals.

20. The method according to claim 18, wherein the step of receiving UTMI+ signals at a UTMI+ conversion block comprises:
  receiving the UTMI+ signals through a switch when the switch is in a closed position, and further wherein the UTMI+ signals are not receivable by the UTMI conversion block when the switch is in an open position.

21. The method according to claim 18, wherein the UTMI+ conversion block comprises:
  a UTMI+ transformer configured to receive the first and second UTMI+ signals and modify the received first and second UTMI+ signals into first and second modified UTMI+ signals, and output the modified first and second UTMI+ signals; and
  a UTMI+ low pin count interface (ULPI) wrapper configured to receive the first and second modified UTMI+ signals from the UTMI+ transformer and convert the received modified first and second UTMI+ signals into the first and second ULPI signals.

22. A method enabling to monitor high speed interchip (HSIC) signals using universal serial bus (USB) signals corresponding to the HSIC signals output by or input to a device, the method comprising: receiving first and second USB transceiver macro-cell (UTMI+) signals at a UTMI+ conversion block, the first UTMI+ signals corresponding to first HSIC signals transmitted by the device, and second UTMI+ signals corresponding to second HSIC signals received by the device; transforming the first and second UTMI+ signals into first and second ULPI signals, the first and second ULPI signals being equivalent to the first and second HSIC signals; transmitting out from the device first and second USB signals, corresponding to first and second HSIC signals, respectively; and generating a standard high speed USB handshake signal such that a USB analyzer, when operable connected to receive the first and second USB signals, is able to capture the first and second USB signals.

23. The method according to claim 22, wherein the UTMI+ conversion block includes a UTMI+ transformer configured to receive the first and second UTMI+ signals and transform the received first and second UTMI+ signals into first and second modified UTMI+ signals, and output the modified first and second UTMI+ signals, and wherein the UTMI+ conversion block further includes a UTMI+ low pin count interface (ULPI) wrapper configured to receive the modified first and second ULPI signals from the UTMI+ transformer and convert the received modified first and second UTMI+ signals into the first and second ULPI signals, and further wherein the UTMI+ conversion block includes a switch operable in a mode that connects a USB controller that outputs the first UTMI+ signals to an HSIC PHY transceiver that receives the first UTMI+ signals and outputs the first HSIC signals, and wherein the HSIC PHY transceiver receives the second HSIC signals and outputs the second UTMI+ signals to the USB controller, and further wherein the switch connects both of the first and second UTMI+ signals to the ULPI wrapper.

24. The method according to claim 23, wherein the transforming in the UTMI+ transformer comprises:
  transforming at least one of timing of the received first and second UTMI+ signals, wherein such timing transformation includes inter-packet gap modifications of the received first and second UTMI+ signals.

25. A method enabling to monitor high speed interchip (HSIC) signals, using universal serial bus (USB) signals corresponding to the HSIC signals output from or input in a device, the method comprising: receiving USB transceiver macro-cell (UTMI+) signals at a UTMI+ transformer, wherein the UTMI+ signals represent HSIC signals transmitted or received by the device; transforming the received UTMI+ signals into modified UTMI+ signals; receiving the modified UTMI+ signals at a first port of a switch operating in a first mode; outputting the modified UTMI+ signals from the switch at a second port; receiving the modified UTMI+ signals at a ULPI wrapper, and outputting corresponding ULPI signals; and receiving the corresponding ULPI signal at a ULPI PHY transceiver, and outputting from the ULPI PHY transceiver standard USB signals that correspond to the transmitted or received HSIC signals when the switch is operating in the first mode, wherein the switch operates in a second mode such that modified UTMI+ signals are not received by the switch, the method further comprising: transmitting first ULPI signals by a ULPI USB controller; receiving the transmitted first ULPI signals at a third port of the switch; outputting from the second port of the switch the first ULPI signals; receiving the first ULPI signals at a ULPI wrapper, and outputting corresponding ULPI signals to the ULPI PHY transceiver; transmitting from the ULPI PHY transceiver first USB signals corresponding to the first ULPI signals; receiving second USB signals by the ULPI PHY transceiver; outputting second ULPI signals that correspond to the received second USB signals from the ULPI PHY transceiver; and receiving the second ULPI signals from the ULPI PHY transceiver at the ULPI wrapper and outputting the received second ULPI signals through the switch operating in the second mode to the UILPI USB controller.

26. The method according to claim 25, wherein the step of transforming comprises:
  transforming at least timing of the received UTMI+ signals, wherein such timing transformation includes inter-packet gap modifications of the received UTMI+ signals.

27. The method according to claim 25, wherein the step of receiving UTMI+ signals comprises:
  receiving UTMI+ signals transmitted from at least one of a USB controller and an HSIC PHY transceiver.

28. The method according to claim 25, further comprising:
  transmitting UTMI+ signals by a USB HSIC controller that are received by the HSIC PHY transceiver and output as HSIC signals; and
  receiving HSIC signals by the HSIC PHY transceiver and outputting the same as UTMI+ signals.

29. A method for monitoring high speed interconnect (HSIC) signals output by and input to a device, using universal serial bus (USB) signals corresponding to the HSIC signals, the method comprising: receiving USB transceiver macro-cell (UTMI+) signals at a UTMI+ conversion block, wherein the UTMI+ signals represent HSIC signals; transforming the received UTMI+ signals into UTMI+ low pin count interface (ULPI) signals; and transmitting the ULPI signals as standard USB signals, wherein the transmitted USB signals are equivalent to the HSIC signals received by the UTMI+ conversion block, wherein the UTMI+ conversion block includes: a UTMI+ transformer configured to receive the first and second UTMI+ signals and modify the received first and second UTMI+ signals into first and second modified UTMI+ signals, and output the modified first and second UTMI+ signals; and a UTMI+ low pin count interface (ULPI) wrapper configured to receive the first and second modified UTMI+ signals from the UTMI+ transformer and convert the received modified first and second UTMI+ signals into the first and second ULPI signals.

30. The method according to claim 29, wherein the step of transforming comprises:
  transforming at least timing of the received first and second UTMI+ signals, wherein such timing transformation includes inter-packet gap modifications of the received first and second UTMI+ signals.

31. The method according to claim 29, wherein the step of receiving UTMI+ signals comprises:
receiving UTMI+ signals transmitted from at least one of a USB controller and an HSIC PHY transceiver.

32. The method according to claim 31, wherein
the UTMI+ signals transmitted by the USB controller are received by the HSIC PHY transceiver and output as HSIC signals, and further wherein
the UTMI+ signals transmitted by the HSIC PHY transceiver are received by the HSIC PHY transceiver as HSIC signals.

33. The method according to claim 29, wherein the step of receiving UTMI+ signals at a UTMI+ conversion block comprises:
receiving the UTMI+ signals through a switch when the switch is in a closed position, and further wherein the UTMI+ signals are not receivable by the UTMI conversion block when the switch is in an open position.

34. A method enabling to monitor high speed interchip (HSIC) signals using universal serial bus (USB) signals corresponding to the HSIC signals output by or input to a device, the method comprising: receiving first and second USB transceiver macro-cell (UTMI+) signals at a UTMI+ conversion block, the first UTMI+ signals corresponding to first HSIC signals transmitted by the device, and second UTMI+ signals corresponding to second HSIC signals received by the device; transforming the first and second UTMI+ signals into first and second ULPI signals, the first and second ULPI signals being equivalent to the first and second HSIC signals; and transmitting out from the device first and second USB signals, corresponding to first and second HSIC signals, respectively, wherein the UTMI+ conversion block includes a UTMI+ transformer configured to receive the first and second UTMI+ signals and transform the received first and second UTMI+ signals into first and second modified UTMI+ signals, and output the modified first and second UTMI+ signals, and wherein the UTMI+ conversion block further includes a UTMI+ low pin count interface (ULPI) wrapper configured to receive the modified first and second ULPI signals from the UTMI+ transformer and convert the received modified first and second UTMI+ signals into the first and second ULPI signals, and further wherein the UTMI+ conversion block includes a switch operable in a mode that connects a USB controller that outputs the first UTMI+ signals to an HSIC PHY transceiver that receives the first UTMI+ signals and outputs the first HSIC signals, and wherein the HSIC PHY transceiver receives the second HSIC signals and outputs the second UTMI+ signals to the USB controller, and further wherein the switch connects both of the first and second UTMI+ signals to the ULPI wrapper.

35. The method according to claim 34, wherein the transforming in the UTMI+ transformer comprises:
transforming at least one of timing of the received first and second UTMI+ signals, wherein such timing transformation includes inter-packet gap modifications of the received first and second UTMI+ signals.

36. The method according to claim 34, further comprising:
generating a standard high speed USB handshake signal such that a USB analyzer, when operable connected to receive the first and second USB signals, can capture the first and second USB signals.

* * * * *